United States Patent
Pan et al.

(10) Patent No.: US 11,672,033 B2
(45) Date of Patent: Jun. 6, 2023

(54) METHOD AND APPARATUS FOR SUPPORTING UE-TO-NETWORK RELAY COMMUNICATION IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/532,432

(22) Filed: Nov. 22, 2021

(65) Prior Publication Data

US 2022/0174758 A1 Jun. 2, 2022

Related U.S. Application Data

(60) Provisional application No. 63/120,458, filed on Dec. 2, 2020.

(51) Int. Cl.
*H04W 76/12* (2018.01)
*H04W 76/19* (2018.01)
*H04W 88/04* (2009.01)

(52) U.S. Cl.
CPC ........... *H04W 76/12* (2018.02); *H04W 76/19* (2018.02); *H04W 88/04* (2013.01)

(58) Field of Classification Search
CPC ...... H04W 76/12; H04W 76/19; H04W 88/04
See application file for complete search history.

(56) References Cited

U.S. PATENT DOCUMENTS

| 2014/0349694 | A1* | 11/2014 | Raghothaman | ....... H04W 76/14 455/509 |
| 2016/0212682 | A1* | 7/2016 | Chung | .................. H04W 12/06 |
| 2017/0317740 | A1* | 11/2017 | Basu Mallick | .... H04B 7/15557 |

(Continued)

FOREIGN PATENT DOCUMENTS

EP 3637940 4/2020

OTHER PUBLICATIONS

European Search Report in corresponding EP Application No. 21209494.0, dated Apr. 22, 2022.

(Continued)

*Primary Examiner* — Will W Lin
(74) *Attorney, Agent, or Firm* — Skaar Ulbrich Macari, P.A.

(57) ABSTRACT

A method and device are disclosed for a remote User Equipment (UE) to support UE-to-Network relay communication. The remote UE establishes a PC5 connection with a first relay UE for a relay communication with a first network node. The remote UE also performs a Radio Resource Control (RRC) connection establishment procedure with the first network node via the first relay UE. Furthermore, the remote UE transmits a first RRC message to a second network node via a second relay UE for requesting RRC connection re-establishment, wherein the first RRC message includes a first Cell Radio Network Temporary Identifier (C-RNTI) of the remote UE. Also, the remote UE receives a second RRC message from the second network node via the second relay UE for re-establishing a RRC connection between the second network node and the remote UE, wherein the second RRC message includes a second C-RNTI of the remote UE.

22 Claims, 18 Drawing Sheets

(56) References Cited

U.S. PATENT DOCUMENTS

| | | | | |
|---|---|---|---|---|
| 2017/0359747 | A1* | 12/2017 | Lun | H04W 24/00 |
| 2019/0014535 | A1* | 1/2019 | Chen | H04W 48/16 |
| 2019/0045576 | A1* | 2/2019 | Jung | H04W 48/20 |
| 2019/0098495 | A1* | 3/2019 | Tenny | H04W 12/04 |
| 2019/0373652 | A1* | 12/2019 | Hong | H04W 72/042 |
| 2019/0380128 | A1* | 12/2019 | Park | H04W 48/08 |
| 2020/0029384 | A1* | 1/2020 | Hong | H04W 36/03 |
| 2020/0145889 | A1* | 5/2020 | Yamada | H04W 36/00837 |
| 2021/0051758 | A1* | 2/2021 | Xu | H04W 76/19 |
| 2021/0219368 | A1* | 7/2021 | Fujishiro | H04W 76/19 |
| 2022/0007259 | A1* | 1/2022 | Fujishiro | H04W 72/04 |
| 2022/0086931 | A1* | 3/2022 | Tenny | H04W 88/04 |
| 2022/0095411 | A1* | 3/2022 | Lin | H04W 76/14 |
| 2022/0345926 | A1* | 10/2022 | Siomina | H04W 36/0085 |

OTHER PUBLICATIONS

Lenovo, Motorola Mobility, "Identification PC5-S and Identification on PC5 RRC and RRC Procedures", Agenda Item 6.4.5, R2-1912566, 3GPP TSG-RAN WG2 Meeting #107bis, Chongqin, PRC, Oct. 14-18, 2019.

\* cited by examiner

US 11,672,033 B2

METHOD AND APPARATUS FOR SUPPORTING UE-TO-NETWORK RELAY COMMUNICATION IN A WIRELESS COMMUNICATION SYSTEM

CROSS-REFERENCE TO RELATED APPLICATIONS

The present Application claims the benefit of U.S. Provisional Patent Application Ser. No. 63/120,458 filed on Dec. 2, 2020, the entire disclosure of which is incorporated herein in its entirety by reference.

FIELD

This disclosure generally relates to wireless communication networks, and more particularly, to a method and apparatus for supporting UE-to-network relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for a remote User Equipment (UE) to support UE-to-Network relay communication. In one embodiment, the method includes the remote UE establishing a PC5 connection with a first relay UE for a relay communication with a first network node. The method also includes the remote UE performing a Radio Resource Control (RRC) connection establishment procedure with the first network node via the first relay UE. The method further includes the remote UE transmitting a first RRC message to a second network node via a second relay UE for requesting RRC connection re-establishment, wherein the first RRC message includes a first Cell Radio Network Temporary Identifier (C-RNTI) of the remote UE. In addition, the method includes the remote UE receiving a second RRC message from the second network node via the second relay UE for re-establishing a RRC connection between the second network node and the remote UE, wherein the second RRC message includes a second C-RNTI of the remote UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 38.331 V16.2.0, "NR; Radio Resource Control (RRC) protocol specification (Release 16)"; 3GPP TS38.321 V16.2.1, "NR Medium Access Control (MAC) protocol specification (Release 16)"; 3GPP TR 38.836 V0.2.0, "Study on NR sidelink relay; (Release 17)"; and 3GPP TS 23.287 V16.4.0, "Architecture enhancements for 5G System (5GS) to support Vehicle-to-Everything (V2X) services (Release 16)". The standards and documents listed above are hereby expressly incorporated by reference in their entirety.

Figure 1:
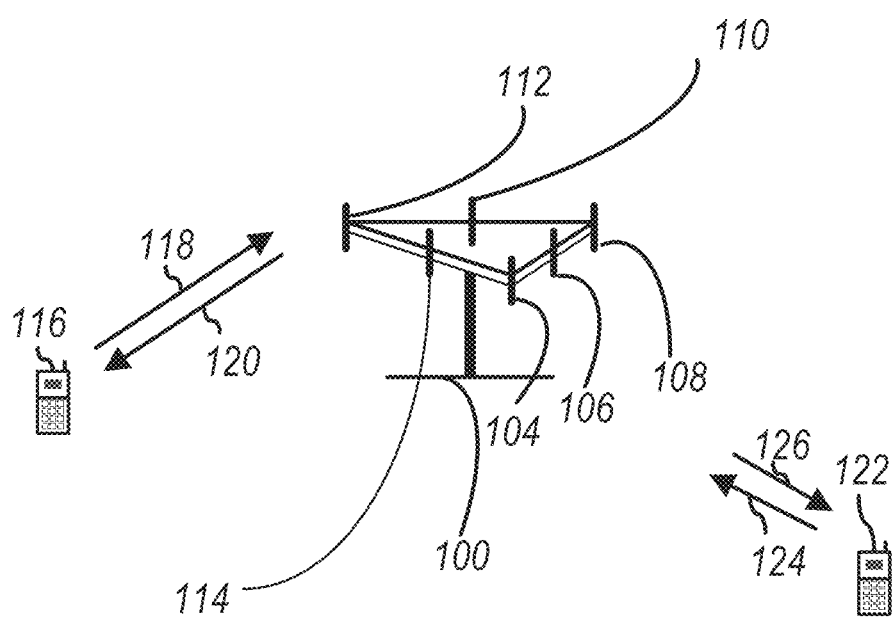
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
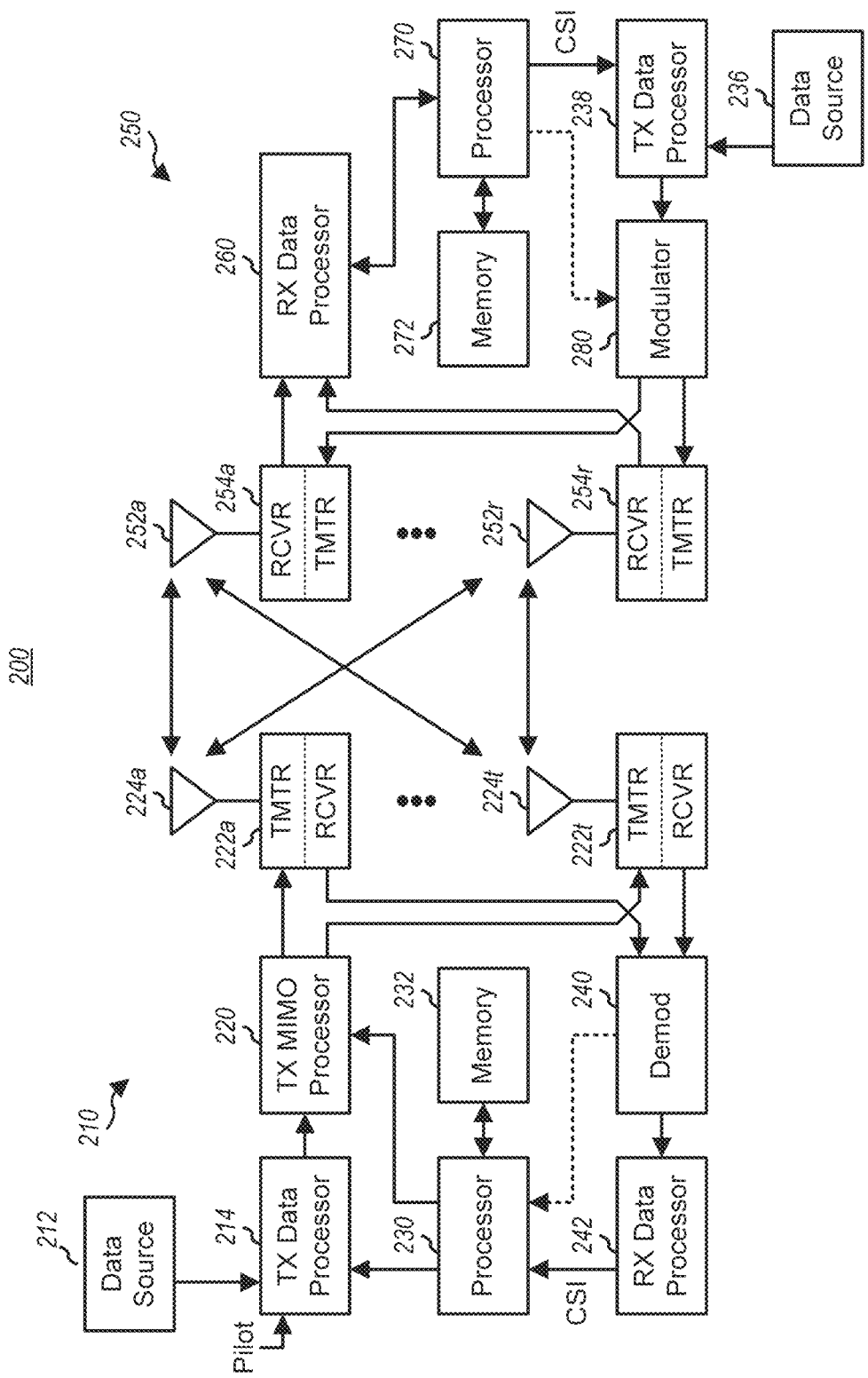
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
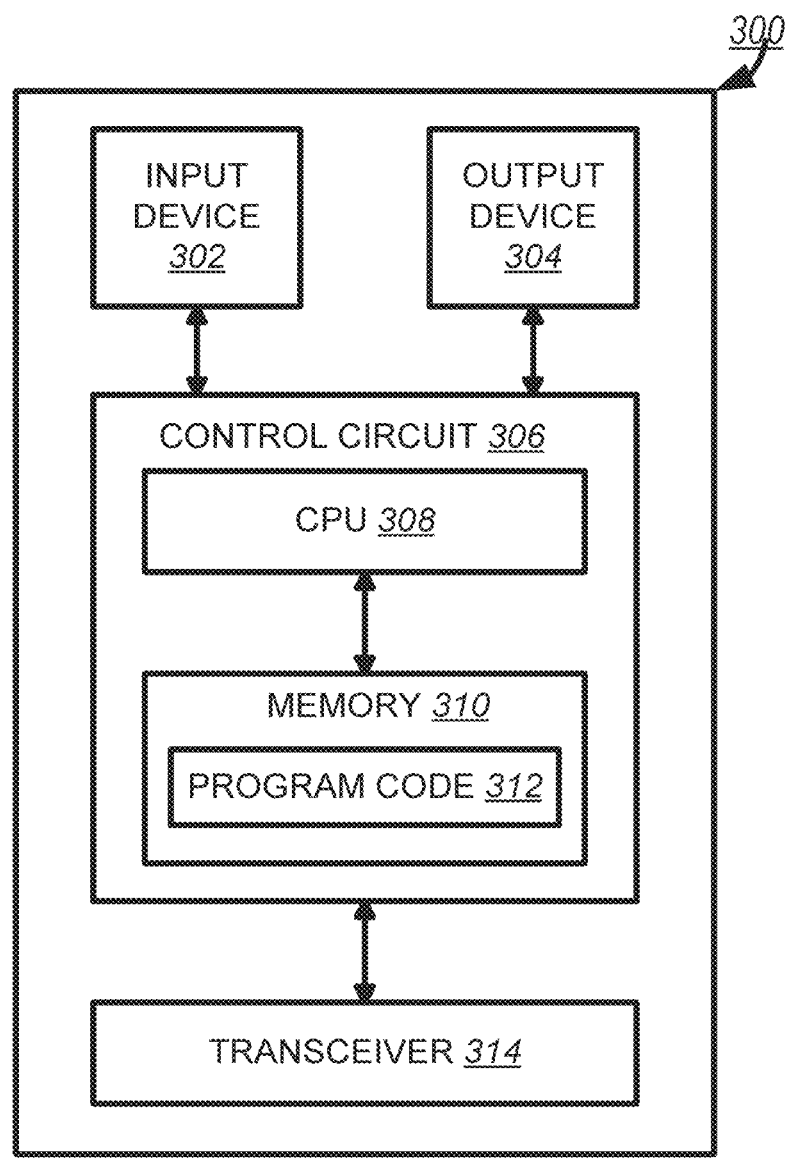
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
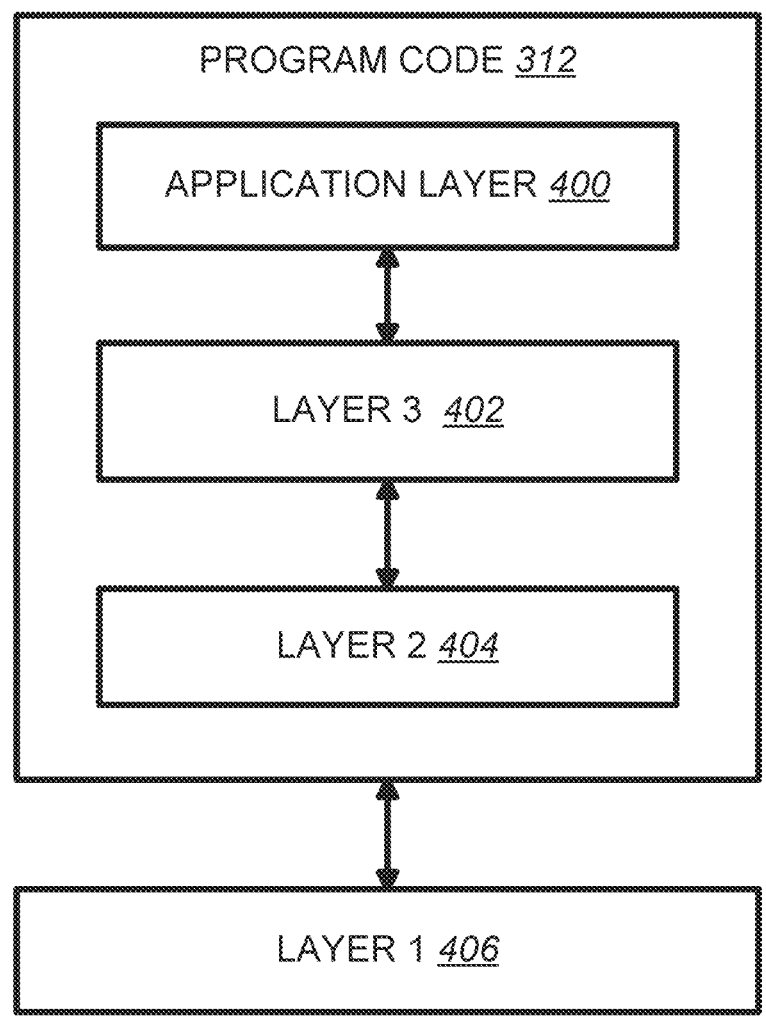
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Figure 5:
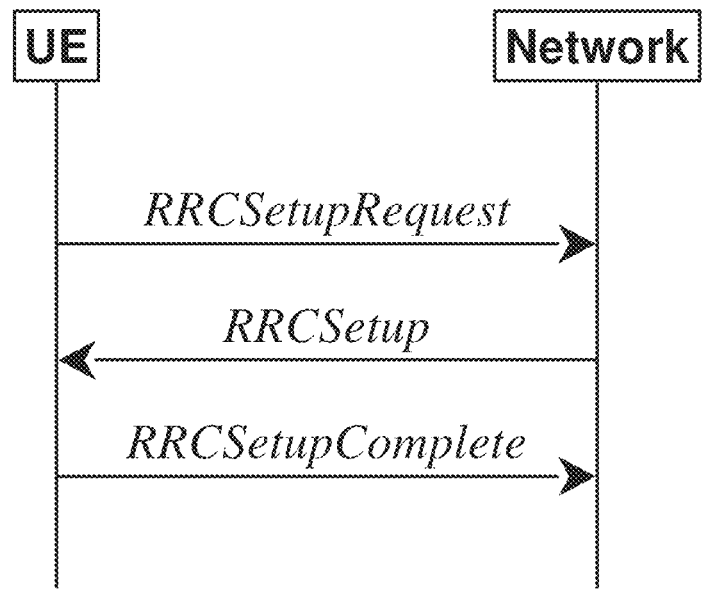
FIG. 5 is a reproduction of Figure 5.3.3.1-1 of 3GPP TS 38.331 V16.2.0.

3GPP TS 38.331 introduced the following:
5.3.3 RRC Connection Establishment
5.3.3.1 General >   Figure 5.3.3.1-1 of 3GPP TS 38.331 V16.2.0, Entitled "RRC Connection Establishment, Successful", is Reproduced as FIG. 5

The purpose of this procedure is to establish an RRC connection. RRC connection establishment involves SRB1 establishment. The procedure is also used to transfer the initial NAS dedicated information/message from the UE to the network.
The network applies the procedure e.g. as follows:
    When establishing an RRC connection;
    When UE is resuming or re-establishing an RRC connection, and the network is not able to retrieve or verify the UE context. In this case, UE receives RRCSetup and responds with RRCSetupComplete.
5.3.3.1a Conditions for Establishing RRC Connection for Sidelink Communication
For NR sidelink communication, an RRC connection establishment is initiated only in the following cases:
    1> if configured by upper layers to transmit NR sidelink communication and related data is available for transmission:
        2> if the frequency on which the UE is configured to transmit NR sidelink communication is included in sl-FreqInfoList within SIB12 provided by the cell on which the UE camps; and if the valid version of SIB12 does not include sl-TxPoolSelectedNormal for the concerned frequency;
For V2X sidelink communication, an RRC connection is initiated only when the conditions specified for V2X sidelink communication in subclause 5.3.3.1a of TS 36.331 [10] are met.
    NOTE: Upper layers initiate an RRC connection. The interaction with NAS is left to UE implementation.
5.3.3.2 Initiation
The UE initiates the procedure when upper layers request establishment of an RRC connection while the UE is in RRC_IDLE and it has acquired essential system information as described in 5.2.2.1, or for sidelink communication as specified in sub-clause 5.3.3.1a.
The UE shall ensure having valid and up to date essential system information as specified in clause 5.2.2.2 before initiating this procedure.

Upon initiation of the procedure, the UE shall:
    1> if the upper layers provide an Access Category and one or more Access Identities upon requesting establishment of an RRC connection:
        2> perform the unified access control procedure as specified in 5.3.14 using the Access Category and Access Identities provided by upper layers;
            3> if the access attempt is barred, the procedure ends;
    1> apply the default L1 parameter values as specified in corresponding physical layer specifications except for the parameters for which values are provided in SIB1;
    1> apply the default MAC Cell Group configuration as specified in 9.2.2;
    1> apply the CCCH configuration as specified in 9.1.1.2;
    1> apply the timeAlignmentTimerCommon included in SIB1;
    1> start timer T300;
    1> initiate transmission of the RRCSetupRequest message in accordance with 5.3.3.3;
5.3.3.3 Actions Related to Transmission of RRCSetupRequest Message
The UE shall set the contents of RRCSetupRequest message as follows:
    1> set the ue-Identity as follows:
        2> if upper layers provide a 5G-S-TMST:
            3> set the ue-Identity to ng-5G-S-TMSI-Part1;
        2> else:
            3> draw a 39-bit random value in the range 0 . . . $2^{39}-1$ and set the ue-Identity to this value;
    NOTE 1: Upper layers provide the 5G-S-TMSI if the UE is registered in the TA of the current cell.
    1> set the establishmentCause in accordance with the information received from upper layers;
The UE shall submit the RRCSetupRequest message to lower layers for transmission.
The UE shall continue cell re-selection related measurements as well as cell re-selection evaluation. If the conditions for cell re-selection are fulfilled, the UE shall perform cell re-selection as specified in 5.3.3.6.
5.3.3.4 Reception of the RRCSetup by the UE
    The UE shall perform the following actions upon reception of the RRCSetup:
    1> if the RRCSetup is received in response to an RRCReestablishmentRequest; or
    1> if the RRCSetup is received in response to an RRCResumeRequest or RRCResumeRequest1:
        2> discard any stored UE Inactive AS context and suspendConfig;
        2> discard any current AS security context including the $K_{EECenc}$ key, the $K_{RRCint}$ key, the $K_{UPint}$ key and the $K_{UPenc}$ key;
        2> release radio resources for all established RBs except SRB0, including release of the RLC entities, of the associated PDCP entities and of SDAP;
        2> release the RRC configuration except for the default L1 parameter values, default MAC Cell Group configuration and CCCH configuration;
        2> indicate to upper layers fallback of the RRC connection;
        2> stop timer T380, if running;
    1> perform the cell group configuration procedure in accordance with the received masterCellGroup and as specified in 5.3.5.5;
    1> perform the radio bearer configuration procedure in accordance with the received radioBearerConfig and as specified in 5.3.5.6;

1> if stored, discard the cell reselection priority information provided by the cellReselectionPriorities or inherited from another RAT;
1> stop timer T300, T301 or T319 if running;
1> if T390 is running:
  2> stop timer T390 for all access categories;
  2> perform the actions as specified in 5.3.14.4;
1> if T302 is running:
  2> stop timer T302;
  2> perform the actions as specified in 5.3.14.4;
1> stop timer T320, if running;
1> if the RRCSetup is received in response to an RRCResumeRequest, RRCResumeRequest1 or RRCSetupRequest:
  2> if T331 is running:
    3> stop timer T331;
    3> perform the actions as specified in 5.7.8.3;
  2> enter RRC_CONNECTED;
  2> stop the cell re-selection procedure;
1> consider the current cell to be the PCell;
1> set the content of RRCSetupComplete message as follows:
  2> if upper layers provide a 5G-S-TMST:
    3> if the RRCSetup is received in response to an RRCSetupRequest:
      4> set the ng-5G-S-TMSI-Value to ng-5G-S-TMSI-Part2;
    3> else:
      4> set the ng-5G-S-TMSI-Value to ng-5G-S-TMSI;
  2> set the selectedPLMN-Identity to the PLMN or SNPN selected by upper layers (TS 24.501 [23]) from the PLMN(s) included in the plmn-IdentityList or the PLMN(s) or SNPN(s) included in the npn-IdentityInfoList in SIB1;
  2> if upper layers provide the 'Registered AMF':
    3> include and set the registeredAMF as follows:
      4> if the PLMN identity of the 'Registered AMF' is different from the PLMN selected by the upper layers:
        5> include the plmnIdentity in the registeredAMF and set it to the value of the PLMN identity in the 'Registered AMF' received from upper layers;
      4> set the amf-Identifier to the value received from upper layers;
    3> include and set the guami-Type to the value provided by the upper layers;
  2> if upper layers provide one or more S-NSSAI (see TS 23.003 [21]):
    3> include the S-NSSAI-List and set the content to the values provided by the upper layers;
  2> set the dedicatedNAS-Message to include the information received from upper layers;
  2> if connecting as an IAB-node:
    3> include the iab-NodeIndication;
  2> if the SIB1 contains idleModeMeasurementsNR and the UE has NR idle/inactive measurement information concerning cells other than the PCell available in VarMeasIdleReport; or
  2> if the SIB1 contains idleModeMeasurementsEUTRA and the UE has E-UTRA idle/inactive measurement information available in VarMeasIdleReport:
    3> include the idleMeasAvailable;
  2> if the UE has logged measurements available for NR and if the RPLMN is included in plmn-IdentityList stored in VarLogMeasReport:
    3> include the logMeasAvailable in the RRCSetupComplete message;
  2> if the UE has Bluetooth logged measurements available and if the RPLMN is included in plmn-IdentityList stored in VarLogMeasReport:
    3> include the logMeasAvailableBT in the RRCSetupComplete message;
  2> if the UE has WLAN logged measurements available and if the RPLMN is included in plmn-IdentityList stored in VarLogMeasReport:
    3> include the logMeasAvailableWLAN in the RRCSetupComplete message;
  2> if the UE has connection establishment failure or connection resume failure information available in VarConnEstFailReport and if the RPLMN is equal to plmn-Identity stored in VarConnEstFailReport:
    3> include connEstFailInfoAvailable in the RRCSetupComplete message;
  2> if the UE has radio link failure or handover failure information available in VarRLF-Report and if the RPLMN is included in plmn-IdentityList stored in VarRLF-Report:
    3> if reconnectCellId in VarRLF-Report is not set:
      4> set timeUntilReconnection in VarRLF-Report to the time that elapsed since the last radio link or handover failure;
      4> set nrReconnectCellId in reconnectCellId in VarRLF-Report to the global cell identity and the tracking area code of the PCell;
    3> include rlf-InfoAvailable in the RRCSetupComplete message;
  2> if the UE supports RLF report for inter-RAT MRO NR as defined in TS 36.306 [62], and if the UE has radio link failure or handover failure information available in VarRLF-Report of TS 36.331 [10]:
    3> if reconnectCellId in VarRLF-Report of TS 36.331[10] is not set:
      4> set timeUntilReconnection in VarRLF-Report of TS 36.331[10] to the time that elapsed since the last radio link or handover failure in LTE;
      4> set nrReconnectCellId in reconnectCellId in VarRLF-Report of TS 36.331[10] to the global cell identity and the tracking area code of the PCell;
    3> if the UE is capable of cross-RAT RLF reporting and if the RPLMN is included in plmn-IdentityList stored in VarRLF-Report of TS 36.331 [10]
      4> include rlf-InfoAvailable in the RRCSetupComplete message;
  2> if the UE supports storage of mobility history information and the UE has mobility history information available in VarMobilityHistoryReport:
    3> include the mobilityHistoryAvail in the RRCSetupComplete message;
  2> if the RRCSetup is received in response to an RRCResumeRequest, RRCResumeRequest1 or RRCSetupRequest:
    3> if speedStateReselectionPars is configured in the SIB2:
      4> include the mobilityState in the RRCSetupComplete message and set it to the mobility state (as specified in TS 38.304 [20]) of the UE just prior to entering RRC_CONNECTED state;

1> submit the RRCSetupComplete message to lower layers for transmission, upon which the procedure ends.

[ . . . ]

5.3.4 Initial AS Security Activation 5.3.4.1 General

Figure 6:
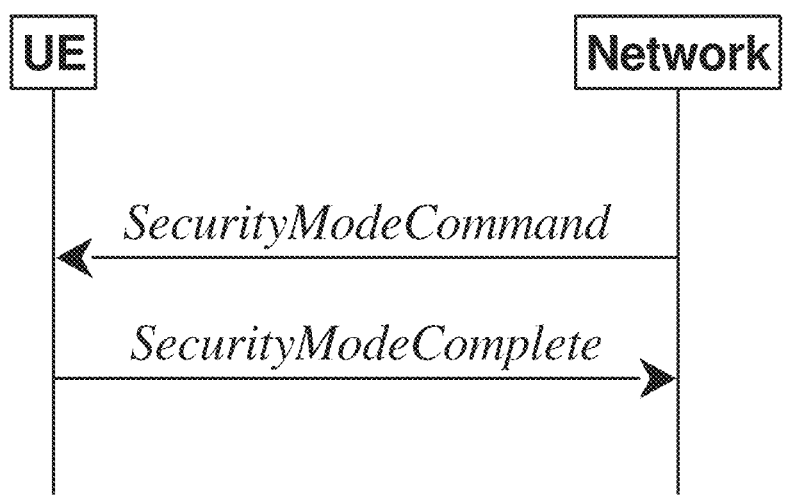
FIG. 6 is a reproduction of Figure 5.3.4.1-1 of 3GPP TS 38.331 V16.2.0.

Figure 5.3.4.1-1 of 3GPP TS 38.331 V16.2.0, Entitled "Security Mode Command, Successful", is Reproduced as FIG. 6

[ . . . ]

The purpose of this procedure is to activate AS security upon RRC connection establishment.

5.3.4.2 Initiation

The network initiates the security mode command procedure to a UE in RRC_CONNECTED. Moreover, the network applies the procedure as follows:
when only SRB1 is established, i.e. prior to establishment of SRB2 and/or DRBs.

5.3.4.3 Reception of the SecurityModeCommand by the UE

The UE shall:
1> derive the $K_{gNB}$ key, as specified in TS 33.501 [11];
1> derive the $K_{RRCint}$ key associated with the integrity-ProtAlgorithm indicated in the SecurityModeCommand message, as specified in TS 33.501 [11];
1> request lower layers to verify the integrity protection of the SecurityModeCommand message, using the algorithm indicated by the integrityProtAlgorithm as included in the SecurityModeCommand message and the $K_{RRCint}$ key;
1> if the SecurityModeCommand message passes the integrity protection check:
2> derive the $K_{RRCenc}$ key and the $K_{UPenc}$ key associated with the cipheringAlgorithm indicated in the SecurityModeCommand message, as specified in TS 33.501 [11];
2> derive the $K_{UPint}$ key associated with the integrityProtAlgorithm indicated in the SecurityModeCommand message, as specified in TS 33.501 [11];
2> configure lower layers to apply SRB integrity protection using the indicated algorithm and the $K_{RRCint}$ key immediately, i.e. integrity protection shall be applied to all subsequent messages received and sent by the UE, including the SecurityModeComplete message;
2> configure lower layers to apply SRB ciphering using the indicated algorithm, the $K_{RRCenc}$ keyafter completing the procedure, i.e. ciphering shall be applied to all subsequent messages received and sent by the UE, except for the SecurityModeComplete message which is sent unciphered;
2> consider AS security to be activated;
2> submit the SecurityModeComplete message to lower layers for transmission, upon which the procedure ends;
1> else:
2> continue using the configuration used prior to the reception of the SecurityModeCommand message, i.e. neither apply integrity protection nor ciphering.
2> submit the SecurityModeFailure message to lower layers for transmission, upon which the procedure ends.

[ . . . ]

5.3.7 RRC Connection Re-Establishment 5.3.7.1 General

Figure 7:
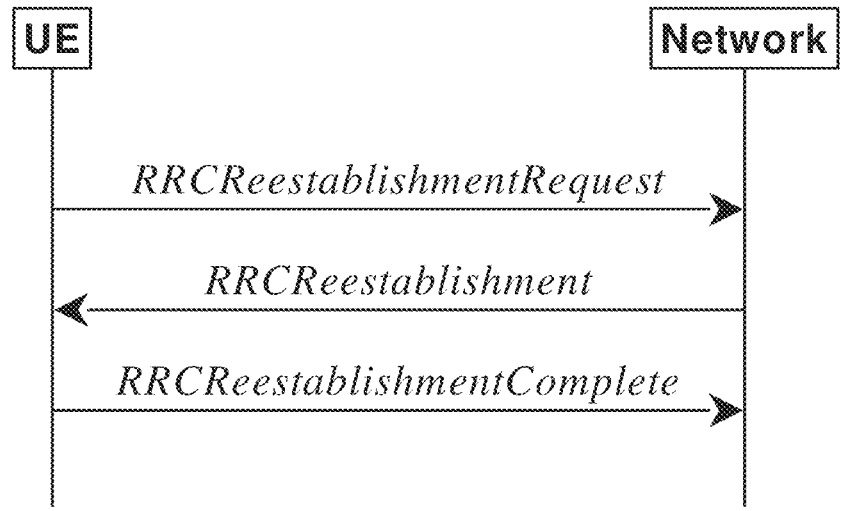
FIG. 7 is a reproduction of Figure 5.3.7.1-1 of 3GPP TS 38.331 V16.2.0.

Figure 5.3.7.1-1 of 3GPP TS 38.331 V16.2.0, Entitled "RRC Connection Re-Establishment, Successful", is Reproduced as FIG. 7

Figure 8:
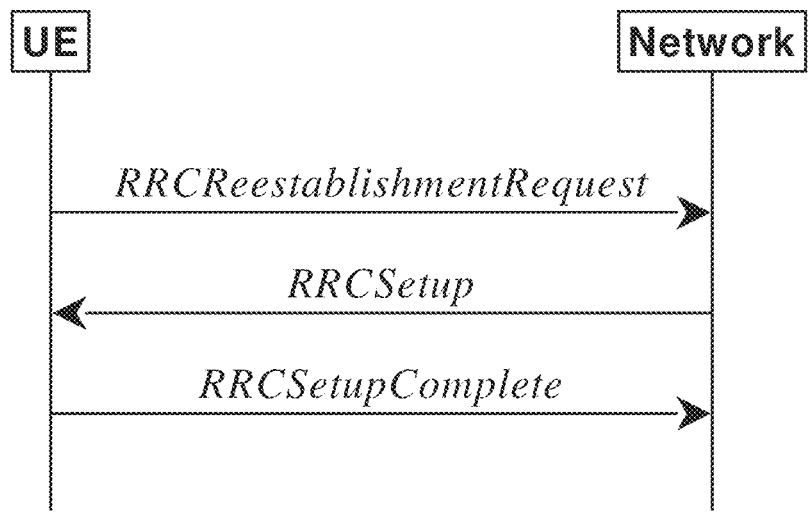
FIG. 8 is a reproduction of Figure 5.3.7.1-2 of 3GPP TS 38.331 V16.2.0.

Figure 5.3.7.1-2 of 3GPP TS 38.331 V16.2.0, Entitled "RRC Re-Establishment, Fallback to RRC Establishment, Successful", is Reproduced as FIG. 8

The purpose of this procedure is to re-establish the RRC connection. A UE in RRC_CONNECTED, for which AS security has been activated with SRB2 and at least one DRB setup or, for IAB, SRB2, may initiate the procedure in order to continue the RRC connection. The connection re-establishment succeeds if the network is able to find and verify a valid UE context or, if the UE context cannot be retrieved, and the network responds with an RRCSetup according to clause 5.3.3.4.

The network applies the procedure e.g as follows:
When AS security has been activated and the network retrieves or verifies the UE context:
to re-activate AS security without changing algorithms;
to re-establish and resume the SRB1;
When UE is re-establishing an RRC connection, and the network is not able to retrieve or verify the UE context:
to discard the stored AS Context and release all RBs;
to fallback to establish a new RRC connection.

If AS security has not been activated, the UE shall not initiate the procedure but instead moves to RRC_IDLE directly, with release cause 'other'. If AS security has been activated, but SRB2 and at least one DRB or, for IAB, SRB2, are not setup, the UE does not initiate the procedure but instead moves to RRC_IDLE directly, with release cause 'RRC connection failure'.

5.3.7.2 Initiation

The UE initiates the procedure when one of the following conditions is met:
1> upon detecting radio link failure of the MCG and t316 is not configured, in accordance with 5.3.10; or
1> upon detecting radio link failure of the MCG while SCG transmission is suspended, in accordance with 5.3.10; or
1> upon detecting radio link failure of the MCG while PSCell change is ongoing, in accordance with 5.3.10; or
1> upon re-configuration with sync failure of the MCG, in accordance with sub-clause 5.3.5.8.3; or
1> upon mobility from NR failure, in accordance with sub-clause 5.4.3.5; or
1> upon integrity check failure indication from lower layers concerning SRB1 or SRB2, except if the integrity check failure is detected on the RRCReestablishment message; or
1> upon an RRC connection reconfiguration failure, in accordance with sub-clause 5.3.5.8.2; or
1> upon detecting radio link failure for the SCG while MCG transmission is suspended, in accordance with subclause 5.3.10.3 in NR-DC or in accordance with TS 36.331 [10] subclause 5.3.11.3 in NE-DC; or
1> upon reconfiguration with sync failure of the SCG while MCG transmission is suspended in accordance with subclause 5.3.5.8.3; or 1> upon SCG change failure while MCG transmission is suspended in accordance with TS 36.331 [10] sub-clause 5.3.5.7a; or
1> upon SCG configuration failure while MCG transmission is suspended in accordance with subclause 5.3.5.8.2 in NR-DC or in accordance with TS 36.331 [10] subclause 5.3.5.5 in NE-DC; or
1> upon integrity check failure indication from SCG lower layers concerning SRB3 while MCG is suspended; or
1> upon T316 expiry, in accordance with sub-clause 5.7.3b.5.
Upon initiation of the procedure, the UE shall:
1> stop timer T310, if running;
1> stop timer T312, if running;
1> stop timer T304, if running;
1> start timer T311;
1> stop timer T316, if running;
1> if UE is not configured with conditionalReconfiguration:
2> reset MAC;
2> release spCellConfig, if configured;
2> suspend all RBs, except SRB0;
2> release the MCG SCell(s), if configured;
2> if MR-DC is configured:
3> perform MR-DC release, as specified in clause 5.3.5.10;
2> release delayBudgetReportingConfig, if configured and stop timer T342, if running;
2> release overheatingAssistanceConfig, if configured and stop timer T345, if running;
2> release idc-AssistanceConfig, if configured;
2> release btNameList, if configured;
2> release wlanNameList, if configured;
2> release sensorNameList, if configured;
2> release drx-PreferenceConfig for the MCG, if configured and stop timer T346a associated with the MCG, if running;
2> release maxBW-PreferenceConfig for the MCG, if configured and stop timer T346b associated with the MCG, if running;
2> release maxCC-PreferenceConfig for the MCG, if configured and stop timer T346c associated with the MCG, if running;
2> release maxMIMO-LayerPreferenceConfig for the MCG, if configured and stop timer T346d associated with the MCG, if running;
2> release minSchedulingOffsetPreferenceConfig for the MCG, if configured stop timer T346e associated with the MCG, if running;
2> release releasePreferenceConfig, if configured stop timer T346f, if running;
2> release onDemandSIB-Request if configured, and stop timer T350, if running;
1> if any DAPS bearer is configured:
2> release source SpCell configuration;
2> reset the source MAC and release the source MAC configuration;
2> for each DAPS bearer:
3> release the RLC entity or entities as specified in TS 38.322 [4], clause 5.1.3, and the associated logical channel for the source SpCell;
3> reconfigure the PDCP entity to release DAPS as specified in TS 38.323 [5];
2> for each SRB:
3> release the PDCP entity for the source SpCell;
3> release the RLC entity as specified in TS 38.322 [4], clause 5.1.3, and the associated logical channel for the source SpCell;
2> release the physical channel configuration for the source SpCell;
2> discard the keys used in the source SpCell (the $K_{gNB}$ key, the $K_{RRCenc}$ key, the $K_{RRCint}$ key, the $K_{UPint}$ key and the $K_{UPenc}$ key), if any;
1> perform cell selection in accordance with the cell selection process as specified in TS 38.304 [20], clause 5.2.6.

5.3.7.3 Actions Following Cell Selection while T311 is Running

Upon selecting a suitable NR cell, the UE shall:
1> ensure having valid and up to date essential system information as specified in clause 5.2.2.2;
1> stop timer T311;
1> if T390 is running:
2> stop timer T390 for all access categories;
2> perform the actions as specified in 5.3.14.4;
1> if the cell selection is triggered by detecting radio link failure of the MCG or re-configuration with sync failure of the MCG, and
1> if attemptCondReconfig is configured; and
1> if the selected cell is one of the candidate cells for which the reconfigurationWithSync is included in the masterCellGroup in VarConditionalReconfig:
2> apply the stored condRRCReconfig associated to the selected cell and perform actions as specified in 5.3.5.3;
1> else:
2> if UE is configured with conditionalReconfiguration:
3> reset MAC;
3> release spCellConfig, if configured;
3> release the MCG SCell(s), if configured;
3> release delayBudgetReportingConfig, if configured and stop timer T342, if running;
3> release overheatingAssistanceConfig, if configured and stop timer T345, if running;
3> if MR-DC is configured:
4> perform MR-DC release, as specified in clause 5.3.5.10;
3> release idc-AssistanceConfig, if configured;
3> release btNameList, if configured;
3> release wlanNameList, if configured;
3> release sensorNameList, if configured;
3> release drx-PreferenceConfig for the MCG, if configured and stop timer T346a associated with the MCG, if running;
3> release maxBW-PreferenceConfig for the MCG, if configured and stop timer T346b associated with the MCG, if running;
3> release maxCC-PreferenceConfig for the MCG, if configured and stop timer T346c associated with the MCG, if running;
3> release maxMIMO-LayerPreferenceConfig for the MCG, if configured and stop timer T346d associated with the MCG, if running;
3> release minSchedulingOffsetPreferenceConfig for the MCG, if configured and stop timer T346e associated with the MCG, if running;
3> release releasePreferenceConfig, if configured and stop timer T346f, if running;
3> release onDemandSIB-Request if configured, and stop timer T350, if running;
3> suspend all RBs, except SRB0;

2> remove all the entries within VarConditionalReconfig, if any;
2> for each measId, if the associated reportConfig has a reportType set to condTriggerConfig:
    3> for the associated reportConfigId:
        4> remove the entry with the matching reportConfigId from the reportConfigList within the VarMeasConfig;
    3> if the associated measObjectId is only associated to a reportConfig with reportType set to condTriggerConfig:
        4> remove the entry with the matching measObjectId from the measObjectList within the VarMeasConfig;
    3> remove the entry with the matching measId from the measIdList within the VarMeasConfig;
2> start timer T301;
2> apply the default L1 parameter values as specified in corresponding physical layer specifications except for the parameters for which values are provided in SIB1;
2> apply the default MAC Cell Group configuration as specified in 9.2.2;
2> apply the CCCH configuration as specified in 9.1.1.2;
2> apply the timeAlignmentTimerCommon included in SIB1;
2> initiate transmission of the RRCReestablishmentRequest message in accordance with 5.3.7.4;
NOTE: This procedure applies also if the UE returns to the source PCell.
Upon selecting an inter-RAT cell, the UE shall:
    1> perform the actions upon going to RRC_IDLE as specified in 5.3.11, with release cause 'RRC connection failure'.

5.3.7.4 Actions Related to Transmission of RRCReestablishmentRequest Message
The UE shall set the contents of RRCReestablishmentRequest message as follows:
    1> if the procedure was initiated due to radio link failure as specified in 5.3.10.3 or handover failure as specified in 5.3.5.8.3:
        2> set the reestablishmentCellId in the VarRLF-Report to the global cell identity of the selected cell;
    1> set the ue-Identity as follows:
        2> set the c-RNTI to the C-RNTI used in the source PCell (reconfiguration with sync or mobility from NR failure) or used in the PCell in which the trigger for the re-establishment occurred (other cases);
        2> set the physCellId to the physical cell identity of the source PCell (reconfiguration with sync or mobility from NR failure) or of the PCell in which the trigger for the re-establishment occurred (other cases);
        2> set the shortMAC-I to the 16 least significant bits of the MAC-I calculated:
            3> over the ASN.1 encoded as per clause 8 (i.e., a multiple of 8 bits) VarShortMAC-Input;
            3> with the $K_{RRCint}$ key and integrity protection algorithm that was used in the source PCell (reconfiguration with sync or mobility from NR failure) or of the PCell in which the trigger for the re-establishment occurred (other cases); and
            3> with all input bits for COUNT, BEARER and DIRECTION set to binary ones;
    1> set the reestablishmentCause as follows:
        2> if the re-establishment procedure was initiated due to reconfiguration failure as specified in 5.3.5.8.2:
            3> set the reestablishmentCause to the value reconfigurationFailure;
        2> else if the re-establishment procedure was initiated due to reconfiguration with sync failure as specified in 5.3.5.8.3 (intra-NR handover failure) or 5.4.3.5 (inter-RAT mobility from NR failure):
            3> set the reestablishmentCause to the value handoverFailure;
        2> else:
            3> set the reestablishmentCause to the value otherFailure;
    1> re-establish PDCP for SRB1;
    1> re-establish RLC for SRB1;
    1> apply the specified configuration defined in 9.2.1 for SRB1;
    1> configure lower layers to suspend integrity protection and ciphering for SRB1; NOTE: Ciphering is not applied for the subsequent RRCReestablishment message used to resume the connection. An integrity check is performed by lower layers, but merely upon request from RRC.
    1> resume SRB1;
    1> submit the RRCReestablishmentRequest message to lower layers for transmission.

5.3.7.5 Reception of the RRCReestablishment by the UE
The UE shall:
    1> stop timer T301;
    1> consider the current cell to be the PCell;
    1> store the nextHopChainingCount value indicated in the RRCReestablishment message;
    1> update the $K_{gNB}$ key based on the current $K_{gNB}$ key or the NH, using the stored nextHopChainingCount value, as specified in TS 33.501 [11];
    1> derive the $K_{RRCenc}$ and $K_{UPenc}$ keys associated with the previously configured cipheringAlgorithm, as specified in TS 33.501 [11];
    1> derive the $K_{RRCint}$ and $K_{UPint}$ keys associated with the previously configured integrityProtAlgorithm, as specified in TS 33.501 [11].
    1> request lower layers to verify the integrity protection of the RRCReestablishment message, using the previously configured algorithm and the $K_{RRCint}$ key;
    1> if the integrity protection check of the RRCReestablishment message fails:
        2> perform the actions upon going to RRC_IDLE as specified in 5.3.11, with release cause 'RRC connection failure', upon which the procedure ends;
    1> configure lower layers to resume integrity protection for SRB1 using the previously configured algorithm and the $K_{RRCint}$ key immediately, i.e., integrity protection shall be applied to all subsequent messages received and sent by the UE, including the message used to indicate the successful completion of the procedure;
    1> configure lower layers to resume ciphering for SRB1 using the previously configured algorithm and, the $K_{RRCenc}$ key immediately, i.e., ciphering shall be applied to all subsequent messages received and sent by the UE, including the message used to indicate the successful completion of the procedure;
    1> release the measurement gap configuration indicated by the measGapConfig, if configured;
    1> set the content of RRCReestablishmentComplete message as follows:
        2> if the UE has logged measurements available for NR and if the RPLMN is included in plmn-IdentityList stored in VarLogMeasReport:
            3> include the logMeasAvailable in the RRCReestablishmentComplete message;

2> if the UE has Bluetooth logged measurements available and if the RPLMN is included in plmn-IdentityList stored in VarLogMeasReport:
   3> include the logMeasAvailableBT in the RRCReestablishmentComplete message;
2> if the UE has WLAN logged measurements available and if the RPLMN is included in plmn-IdentityList stored in VarLogMeasReport:
   3> include the logMeasAvailableWLAN in the RRCReestablishmentComplete message;
2> if the UE has connection establishment failure or connection resume failure information available in VarConnEstFailReport and if the RPLMN is equal to plmn-Identity stored in VarConnEstFailReport:
   3> include connEstFailInfoAvailable in the RRCReestablishmentComplete message;
2> if the UE has radio link failure or handover failure information available in VarRLF-Report and if the RPLMN is included in plmn-IdentityList stored in VarRLF-Report; or
2> if the UE has radio link failure or handover failure information available in VarRLF-Report of TS 36.331 [10] and if the UE is capable of cross-RAT RLF reporting and if the RPLMN is included in plmn-IdentityList stored in VarRLF-Report of TS 36.331 [10]:
   3> include rlf-InfoAvailable in the RRCReestablishmentComplete message;
1> submit the RRCReestablishmentComplete message to lower layers for transmission;
1> the procedure ends.

5.3.7.6 T311 Expiry

Upon T311 expiry, the UE shall:
 1> if the procedure was initiated due to radio link failure or handover failure:
   2> set the noSuitableCellFound in the VarRLF-Report to true;
 1> perform the actions upon going to RRC_IDLE as specified in 5.3.11, with release cause 'RRC connection failure'.

5.3.7.7 T301 Expiry or Selected Cell No Longer Suitable

The UE shall:
 1> if timer T301 expires; or
 1> if the selected cell becomes no longer suitable according to the cell selection criteria as specified in TS 38.304 [20]:
   2> perform the actions upon going to RRC_IDLE as specified in 5.3.11, with release cause 'RRC connection failure'.

5.3.7.8 Reception of the RRCSetup by the UE

The UE shall:
 1> perform the RRC connection establishment procedure as specified in 5.3.3.4.

[ ... ]

6.2.2 Message Definitions

[ ... ]

RRCSetup

The RRCSetup message is used to establish SRB1.
Signalling radio bearer: SRB0
RLC-SAP: TM
Logical channel: CCCH
Direction: Network to UE RRCSetup Message

```
-- ASN1START
-- TAG-RRCSETUP-START
RRCSetup ::=                        SEQUENCE {
    rrc-TransactionIdentifier           RRC-TransactionIdentifier,
    criticalExtensions                  CHOICE {
        rrcSetup                            RRCSetup-IEs,
        criticalExtensionsFuture            SEQUENCE { }
    }
}
RRCSetup-IEs ::=                    SEQUENCE {
    radioBearerConfig                   RadioBearerConfig,
    masterCellGroup                     OCTET STRING (CONTAINING CellGroupConfig),
    lateNonCriticalExtension            OCTET STRING
OPTIONAL,
    nonCriticalExtension                SEQUENCE{ }
OPTIONAL
}
-- TAG-RRCSETUP-STOP
-- ASN1STOP
```

| RRCSetup-IEs field descriptions |
|---|
| masterCellGroup<br>The network configures only the RLC bearer for the SRB1, mac-CellGroupConfig, physicalCellGroupConfig and spCellConfig.<br>radioBearerConfig<br>Only SRB1 can be configured in RRC setup. |

RRCSetupComplete

The RRCSetupComplete message is used to confirm the successful completion of an RRC connection establishment.
Signalling radio bearer: SRB1
RLC-SAP: AM
Logical channel: DCCH
Direction: UE to Network RRCSetupComplete Message

```
-- ASN1START
-- TAG-RRCSETUPCOMPLETE-START
RRCSetupComplete ::=                    SEQUENCE {
    rrc-TransactionIdentifier               RRC-TransactionIdentifier,
    criticalExtensions                      CHOICE {
        rrcSetupComplete                        RRCSetupComplete-IEs,
        criticalExtensionsFuture                SEQUENCE { }
    }
}
RRCSetupComplete-IEs ::=                SEQUENCE {
    selectedPLMN-Identity                   INTEGER (1..maxPLMN),
    registeredAMF                           RegisteredAMF                               OPTIONAL,
    guami-Type                              ENUMERATED {native, mapped}                 OPTIONAL,
    s-NSSAI-List                            SEQUENCE (SIZE (1..maxNrofS-NSSAI)) OF S-NSSAI   OPTIONAL,
    dedicatedNAS-Message                    DedicatedNAS-Message,
    ng-5G-S-TMSI-Value                      CHOICE {
        ng-5G-S-TMSI                            NG-5G-S-TMSI,
        ng-5G-S-TMSI-Part2                      BIT STRING (SIZE (9))
    }                                                                                   OPTIONAL,
    lateNonCriticalExtension                OCTET STRING                                OPTIONAL,
    nonCriticalExtension                    RRCSetupComplete-v1610-IEs                  OPTIONAL
}
RRCSetupComplete-v1610-IEs ::=          SEQUENCE {
    iab-NodeIndication-r16                  ENUMERATED {true}                           OPTIONAL,
    idleMeasAvailable-r16                   ENUMERATED {true}                           OPTIONAL,
    ue-MeasurementsAvailable-r16            UE-MeasurementsAvailable-r16                OPTIONAL,
    mobilityHistoryAvail-r16                ENUMERATED {true}                           OPTIONAL,
    mobilityState-r16                       ENUMERATED {normal, medium, high, spare}    OPTIONAL,
    nonCriticalExtension                    SEQUENCE{ }                                 OPTIONAL
}
RegisteredAMF ::=                       SEQUENCE {
    plmn-Identity                           PLMN-Identity                               OPTIONAL,
    amf-Identifier                          AMF-Identifier
}
-- TAG-RRCSETUPCOMPLETE-STOP
-- ASN1STOP
```

| RRCSetupComplete-IEs field descriptions |
|---|
| guami-Type |
| This field is used to indicate whether the GUAMI included is native (derived from native 5G-GUTI) or mapped (from EPS, derived from EPS GUTI) as specified in TS 24.501 [23]. |
| iab-NodeIndication |
| This field is used to indicate that the connection is being established by an IAB-node [2]. |
| idleMeasAvailable |
| Indication that the UE has idle/inactive measurement report available. |
| mobilityState |
| This field indicates the UE mobility state (as defined in TS 38.304 [20], clause 5.2.4.3) just prior to UE going into RRC_CONNECTED state. The UE indicates the value of medium and high when being in Medium-mobility and High-mobility states respectively. Otherwise the UE indicates the value normal. |
| ng-5G-S-TMSI-Part2 |
| The leftmost 9 bits of 5G-S-TMSI. |
| registeredAMF |
| This field is used to transfer the GUAMI of the AMF where the UE is registered, as provided by upper layers, see TS 23.003 [21]. |
| selectedPLMN-Identity |
| Index of the PLMN or SNPN selected by the UE from the plmn-IdentityList or npn-IdentityInfoList fields included in SIB1. |

RRCSetupRequest

The RRCSetupRequest message is used to request the establishment of an RRC connection.

Signalling radio bearer: SRB0
RLC-SAP: TM
Logical channel: CCCH
Direction: UE to Network RRCSetupRequest Message

```
-- ASN1START
-- TAG-RRCSETUPREQUEST-START
RRCSetupRequest ::=             SEQUENCE {
    rrcSetupRequest                 RRCSetupRequest-IEs
}
RRCSetupRequest-IEs ::=         SEQUENCE {
    ue-Identity                     InitialUE-Identity,
    establishmentCause              EstablishmentCause,
    spare                           BIT STRING (SIZE (1))
}
InitialUE-Identity ::=          CHOICE {
    ng-5G-S-TMSI-Part1              BIT STRING (SIZE (39)),
    randomValue                     BIT STRING (SIZE (39))
}
```

```
EstablishmentCause ::=          ENUMERATED {
                                    emergency, highPriorityAccess, mt-Access, mo-Signalling,
                                    mo-Data, mo-VoiceCall, mo-VideoCall, mo-SMS, mps-
PriorityAccess, mcs-PriorityAccess,
                                    spare6, spare5, spare4, spare3, spare2, spare1}
-- TAG-RRCSETUPREQUEST-STOP
-- ASN1STOP
```

| RRCSetupRequests-IEs field descriptions |
| --- |
| establishmentCause<br>Provides the establishment cause for the RRCSetupRequest in accordance with the information received from upper layers. gNB is not expected to reject an RRCSetupRequest due to unknown cause value being used by the UE.<br>ue-Identity<br>UE identity included to facilitate contention resolution by lower layers. |

| InitialUE-Identity field descriptions |
| --- |
| ng-5G-TMSI-Part1<br>The rightmost 39 bits of 5G-S-TMSI. |

| InitialUE-Identity field descriptions |
| --- |
| randomValue<br>Integer value in the range 0 to $2^{39} - 1$. |

SecurityModeCommand

The SecurityModeCommand message is used to command the activation of AS security.
    Signalling radio bearer: SRB1
    RLC-SAP: AM
    Logical channel: DCCH
    Direction: Network to UE SecurityModeCommand Message

```
-- ASN1START
-- TAG-SECURITYMODECOMMAND-START
SecurityModeCommand ::=                 SEQUENCE {
    rrc-TransactionIdentifier               RRC-TransactionIdentifier,
    criticalExtensions                      CHOICE {
        securityModeCommand                     SecurityModeCommand-IEs,
        criticalExtensionsFuture                SEQUENCE { }
    }
}
SecurityModeCommand-IEs ::=             SEQUENCE {
    securityConfigSMC                       SecurityConfigSMC,
    lateNonCriticalExtension                OCTET STRING
OPTIONAL,
    nonCriticalExtension                    SEQUENCE{ }
OPTIONAL
}
SecurityConfigSMC ::=                   SEQUENCE {
    securityAlgorithmConfig                 SecurityAlgorithmConfig,
    ...
}
-- TAG-SECURITYMODECOMMAND-STOP
-- ASN1STOP
```

SecurityModeComplete
The SecurityModeComplete message is used to confirm the successful completion of a security mode command.
    Signalling radio bearer: SRB1
    RLC-SAP: AM
    Logical channel: DCCH
    Direction: UE to Network SecurityModeComplete Message

```
-- ASN1START
-- TAG-SECURITYMODECOMPLETE-START
SecurityModeComplete ::=                SEQUENCE {
    rrc-TransactionIdentifier               RRC-TransactionIdentifier,
    criticalExtensions                      CHOICE {
        securityModeComplete                    SecurityModeComplete-IEs,
        criticalExtensionsFuture                SEQUENCE { }
```

```
    }
}
SecurityModeComplete-IEs ::=            SEQUENCE {
    lateNonCriticalExtension                OCTET STRING
OPTIONAL,
    nonCriticalExtension                    SEQUENCE{ }
OPTIONAL
}
-- TAG-SECURITYMODECOMPLETE-STOP
-- ASN1STOP
```

RRCReestablishment

The RRCReestablishment message is used to re-establish SRB1.

Signalling radio bearer: SRB1
RLC-SAP: AM
Logical channel: DCCH
Direction: Network to UE RRCReestablishment Message

```
-- ASN1START
-- TAG-RRCREESTABLISHMENT-START
RRCReestablishment ::=                  SEQUENCE {
    rrc-TransactionIdentifier               RRC-TransactionIdentifier,
    criticalExtensions                      CHOICE {
        rrcReestablishment                      RRCReestablishment-IEs,
        criticalExtensionsFuture                SEQUENCE { }
    }
}
RRCReestablishment-IEs ::=              SEQUENCE {
    nextHopChainingCount                    NextHopChainingCount,
    lateNonCriticalExtension                OCTET STRING           OPTIONAL,
    nonCriticalExtension                    SEQUENCE { }           OPTIONAL
}
-- TAG-RRCREESTABLISHMENT-STOP
-- ASN1STOP
```

RRCReestablishmentComplete

The RRCReestablishmentComplete message is used to confirm the successful completion of an RRC connection re-establishment.

Signalling radio bearer: SRB1
RLC-SAP: AM
Logical channel: DCCH
Direction: UE to Network RRCReestablishmentComplete Message

```
-- ASN1START
-- TAG-RRCREESTABLISHMENTCOMPLETE-START
RRCReestablishmentComplete ::=          SEQUENCE {
    rrc-TransactionIdentifier               RRC-TransactionIdentifier,
    criticalExtensions                      CHOICE {
        rrcReestablishmentComplete              RRCReestablishmentComplete-IEs,
        criticalExtensionsFuture                SEQUENCE { }
    }
}
RRCReestablishmentComplete-IEs ::=      SEQUENCE {
    lateNonCriticalExtension                OCTET STRING                       OPTIONAL,
    nonCriticalExtension                    RRCReestablishmentComplete-v1610-IEs   OPTIONAL
}
RRCReestablishmentComplete-v1610-IEs ::= SEQUENCE {
    ue-MeasurementsAvailable-r16            UE-MeasurementsAvailable-r16   OPTIONAL,
    nonCriticalExtension                    SEQUENCE { }                   OPTIONAL
}
-- TAG-RRCREESTABLISHMENTCOMPLETE-STOP
-- ASN1STOP
```

RRCReestablishmentRequest
The RRCReestablishmentRequest message is used to request the reestablishment of an RRC connection.
Signalling radio bearer: SRB0
RLC-SAP: TM
Logical channel: CCCH
Direction: UE to Network RRCReestablishmentRequest Message

```
-- ASN1START
-- TAG-RRCREESTABLISHMENTREQUEST-START
RRCReestablishmentRequest ::=           SEQUENCE {
    rrcReestablishmentRequest               RRCReestablishmentRequest-IEs
}
RRCReestablishmentRequest-IEs ::=       SEQUENCE {
    ue-Identity                             ReestabUE-Identity,
    reestablishmentCause                    ReestablishmentCause,
    spare                                   BIT STRING (SIZE (1))
}
ReestabUE-Identity ::=                  SEQUENCE {
    c-RNTI                                  RNTI-Value,
    physCellId                              PhysCellId,
    shortMAC-I                              ShortMAC-I
}
ReestablishmentCause ::=                ENUMERATED {reconfigurationFailure, handoverFailure,
otherFailure, spare1}
-- TAG-RRCREESTABLISHMENTREQUEST-STOP
-- ASN1STOP
```

| ReestabUE-Identity field descriptions |
|---|
| physCellId<br>The Physical Cell Identity of the PCell the UE was connected to prior to the failure. |

| RRCReestablishmentRequest-IEs field descriptions |
|---|
| reestablishmentCause<br>Indicates the failure cause that triggered the re-establishment procedure. gNB in not expected to reject a RRCReestablishmentRequest due to unknown cause value being used by the UE.<br>ue-Identity<br>UE identity included to retrieve UE context and to facilitate contention resolution by lower layers. |

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3
RLC-SAP: AM
Logical channel: DCCH
Direction: Network to UE RRCReconfiguration Message

```
-- ASN1START
-- TAG-RRCRECONFIGURATION-START
RRCReconfiguration ::=                  SEQUENCE {
    rrc-TransactionIdentifier               RRC-TransactionIdentifier,
    criticalExtensions                      CHOICE {
        rrcReconfiguration                      RRCReconfiguration-IEs,
        criticalExtensionsFuture                SEQUENCE { }
    }
}
RRCReconfiguration-IEs ::=              SEQUENCE {
    radioBearerConfig                       RadioBearerConfig
OPTIONAL, -- Need M
    secondaryCellGroup                      OCTET STRING (CONTAINING CellGroupConfig)
OPTIONAL, -- Cond SCG
    measConfig                              MeasConfig
OPTIONAL, -- Need M
    lateNonCriticalExtension                OCTET STRING
OPTIONAL,
    nonCriticalExtension                    RRCReconfiguration-v1530-IEs
OPTIONAL
}
```

[ . . . ]
3GPP TS 38.321 introduced the following:
5.1 Random Access Procedure
5.1.1 Random Access Procedure Initialization
The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.
[ . . . ]
5.1.3 Random Access Preamble Transmission
The MAC entity shall, for each Random Access Preamble:
1> if PREAMBLE_TRANSMISSION_COUNTER is greater than one; and
1> if the notification of suspending power ramping counter has not been received from lower layers; and
1> if LBT failure indication was not received from lower layers for the last Random Access Preamble transmission; and
1> if SSB or CSI-RS selected is not changed from the selection in the last Random Access Preamble transmission:
  2> increment PREAMBLE_POWER_RAMPING_COUNTER by 1.
1> select the value of DELTA_PREAMBLE according to clause 7.3;
1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA;
1> except for contention-free Random Access Preamble for beam failure recovery request, compute the RA-RNTI associated with the PRACH occasion in which the Random Access Preamble is transmitted;
1> instruct the physical layer to transmit the Random Access Preamble using the selected PRACH occasion, corresponding RA-RNTI (if available), PREAMBLE_INDEX, and PREAMBLE_RECEIVED_TARGET_POWER.
1> if LBT failure indication is received from lower layers for this Random Access Preamble transmission:
  2> if lbt-FailureRecoveryConfig is configured:
    3> perform the Random Access Resource selection procedure (see clause 5.1.2).
  2> else:
    3> increment PREAMBLE_TRANSMISSION_COUNTER by 1;
    3> if PREAMBLE_TRANSMISSION_COUNTER=preambleTransMax+1:
      4> if the Random Access Preamble is transmitted on the SpCell:
        5> indicate a Random Access problem to upper layers;
        5> if this Random Access procedure was triggered for SI request:
          6> consider the Random Access procedure unsuccessfully completed.
      4> else if the Random Access Preamble is transmitted on an SCell:
        5> consider the Random Access procedure unsuccessfully completed.
  3> if the Random Access procedure is not completed:
    4> perform the Random Access Resource selection procedure (see clause 5.1.2). The RA-RNTI associated with the PRACH occasion in which the Random Access Preamble is transmitted, is computed as:

RA-RNTI=1+s_id+14×t_id+14×80×f_id+14×80×8×ul_carrier_id where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of µ specified in clause 5.3.2 in TS 38.211 [8], f_id is the index of the PRACH occasion in the frequency domain (0≤f_id<8), and ul_carrier_id is the UL carrier used for Random Access Preamble transmission (0 for NUL carrier, and 1 for SUL carrier).
5.1.4 Random Access Response Reception
Once the Random Access Preamble is transmitted and regardless of the possible occurrence of a measurement gap, the MAC entity shall:
1> if the contention-free Random Access Preamble for beam failure recovery request was transmitted by the MAC entity:
  2> start the ra-Response Window configured in BeamFailureRecoveryConfig at the first PDCCH occasion as specified in TS 38.213 [6] from the end of the Random Access Preamble transmission;
  2> monitor for a PDCCH transmission on the search space indicated by recoverySearchSpaceId of the SpCell identified by the C-RNTI while ra-ResponseWindow is running.
1> else:
  2> start the ra-Response Window configured in RACH-ConfigCommon at the first PDCCH occasion as specified in TS 38.213 [6] from the end of the Random Access Preamble transmission;
  2> monitor the PDCCH of the SpCell for Random Access Response(s) identified by the RA-RNTI while the ra-Response Window is running.
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
  2> consider the Random Access procedure successfully completed.
1> else if a valid (as specified in TS 38.213 [6]) downlink assignment has been received on the PDCCH for the RA-RNTI and the received TB is successfully decoded:
  2> if the Random Access Response contains a MAC subPDU with Backoff Indicator:
    3> set the PREAMBLE_BACKOFF to value of the BI field of the MAC subPDU using Table 7.2-1, multiplied with SCALING_FACTOR_BI.
  2> else:
    3> set the PREAMBLE_BACKOFF to 0 ms.
  2> if the Random Access Response contains a MAC subPDU with Random Access Preamble identifier corresponding to the transmitted PREAMBLE_INDEX (see clause 5.1.3):
    3> consider this Random Access Response reception successful.

2> if the Random Access Response reception is considered successful:
   3> if the Random Access Response includes a MAC subPDU with RAPID only:
      4> consider this Random Access procedure successfully completed;
      4> indicate the reception of an acknowledgement for SI request to upper layers.
   3> else:
      4> apply the following actions for the Serving Cell where the Random Access Preamble was transmitted:
         5> process the received Timing Advance Command (see clause 5.2);
         5> indicate the preambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP);
         5> if the Random Access procedure for an SCell is performed on uplink carrier where pusch-Config is not configured:
            6> ignore the received UL grant.
         5> else:
            6> process the received UL grant value and indicate it to the lower layers.
      4> if the Random Access Preamble was not selected by the MAC entity among the contention-based Random Access Preamble(s):
         5> consider the Random Access procedure successfully completed.
      4> else:
         5> set the TEMPORARY_C-RNTI to the value received in the Random Access Response;
         5> if this is the first successfully received Random Access Response within this Random Access procedure:
            6> if the transmission is not being made for the CCCH logical channel:
               7> indicate to the Multiplexing and assembly entity to include a C-RNTI MAC CE in the subsequent uplink transmission.
            6> if the Random Access procedure was initiated for SpCell beam failure recovery:
               7> indicate to the Multiplexing and assembly entity to include a BFR MAC CE or a Truncated BFR MAC CE in the subsequent uplink transmission.
            6> obtain the MAC PDU to transmit from the Multiplexing and assembly entity and store it in the Msg3 buffer.

NOTE: If within a Random Access procedure, an uplink grant provided in the Random Access Response for the same group of contention-based Random Access Preambles has a different size than the first uplink grant allocated during that Random Access procedure, the UE behavior is not defined.

1> if ra-Response Window configured in BeamFailureRecoveryConfig expires and if a PDCCH transmission on the search space indicated by recoverySearchSpaceId addressed to the C-RNTI has not been received on the Serving Cell where the preamble was transmitted; or
1> if ra-Response Window configured in RACH-ConfigCommon expires, and if the Random Access Response containing Random Access Preamble identifiers that matches the transmitted PREAMBLE_INDEX has not been received:
   2> consider the Random Access Response reception not successful;
   2> increment PREAMBLE_TRANSMISSION_COUNTER by 1;
   2> if PREAMBLE_TRANSMISSION_COUNTER=preambleTransMax+1:
      3> if the Random Access Preamble is transmitted on the SpCell:
         4> indicate a Random Access problem to upper layers;
         4> if this Random Access procedure was triggered for SI request:
            5> consider the Random Access procedure unsuccessfully completed.
      3> else if the Random Access Preamble is transmitted on an SCell:
         4> consider the Random Access procedure unsuccessfully completed.
   2> if the Random Access procedure is not completed:
      3> select a random backoff time according to a uniform distribution between 0 and the PREAMBLE_BACKOFF;
      3> if the criteria (as defined in clause 5.1.2) to select contention-free Random Access Resources is met during the backoff time:
         4> perform the Random Access Resource selection procedure (see clause 5.1.2);
      3> else if the Random Access procedure for an SCell is performed on uplink carrier where pusch-Config is not configured:
         4> delay the subsequent Random Access transmission until the Random Access Procedure is triggered by a PDCCH order with the same ra-PreambleIndex, ra-ssb-OccasionMaskIndex, and UL/SUL indicator TS 38.212 [9].
      3> else:
         4> perform the Random Access Resource selection procedure (see clause 5.1.2) after the backoff time.

The MAC entity may stop ra-Response Window (and hence monitoring for Random Access Response(s)) after successful reception of a Random Access Response containing Random Access Preamble identifiers that matches the transmitted PREAMBLE_INDEX.

HARQ operation is not applicable to the Random Access Response reception.

5.1.5 Contention Resolution

Once Msg3 is transmitted the MAC entity shall:
   1> start the ra-ContentionResolutionTimer and restart the ra-ContentionResolutionTimer at each HARQ retransmission in the first symbol after the end of the Msg3 transmission;
   1> monitor the PDCCH while the ra-ContentionResolutionTimer is running regardless of the possible occurrence of a measurement gap;
   1> if notification of a reception of a PDCCH transmission of the SpCell is received from lower layers:
      2> if the C-RNTI MAC CE was included in Msg3:
         3> if the Random Access procedure was initiated for SpCell beam failure recovery (as specified in clause 5.17) and the PDCCH transmission is addressed to the C-RNTI; or 3> if the Random Access procedure was initiated by a PDCCH order and the PDCCH transmission is addressed to the C-RNTI; or
3> if the Random Access procedure was initiated by the MAC sublayer itself or by the RRC sublayer and the PDCCH transmission is addressed to the C-RNTI and contains a UL grant for a new transmission:
  4> consider this Contention Resolution successful;
  4> stop ra-ContentionResolutionTimer;
  4> discard the TEMPORARY_C-RNTI;
  4> consider this Random Access procedure successfully completed.
2> else if the CCCH SDU was included in Msg3 and the PDCCH transmission is addressed to its TEMPORARY-C-RNTI:
  3> if the MAC PDU is successfully decoded:
    4> stop ra-ContentionResolutionTimer;
    4> if the MAC PDU contains a UE Contention Resolution Identity MAC CE; and
    4> if the UE Contention Resolution Identity in the MAC CE matches the CCCH SDU transmitted in Msg3:
      5> consider this Contention Resolution successful and finish the disassembly and demultiplexing of the MAC PDU;
      5> if this Random Access procedure was initiated for SI request:
        6> indicate the reception of an acknowledgement for SI request to upper layers.
      5> else:
        6> set the C-RNTI to the value of the TEMPORARY_C-RNTI;
      5> discard the TEMPORARY_C-RNTI;
      5> consider this Random Access procedure successfully completed.
    4> else:
      5> discard the TEMPORARY_C-RNTI;
      5> consider this Contention Resolution not successful and discard the successfully decoded MAC PDU.
1> if ra-ContentionResolutionTimer expires:
  2> discard the TEMPORARY_C-RNTI;
  2> consider the Contention Resolution not successful.
1> if the Contention Resolution is considered not successful:
  2> flush the HARQ buffer used for transmission of the MAC PDU in the Msg3 buffer;
  2> increment PREAMBLE_TRANSMISSION_COUNTER by 1;
  2> if PREAMBLE_TRANSMISSION_COUNTER=preambleTransMax+1:
    3> indicate a Random Access problem to upper layers.
    3> if this Random Access procedure was triggered for SI request:
      4> consider the Random Access procedure unsuccessfully completed.
  2> if the Random Access procedure is not completed:
    3> if the RA_TYPE is set to 4-stepRA:
      4> select a random backoff time according to a uniform distribution between 0 and the PREAMBLE_BACKOFF;
      4> if the criteria (as defined in clause 5.1.2) to select contention-free Random Access Resources is met during the backoff time:
        5> perform the Random Access Resource selection procedure (see clause 5.1.2);
      4> else:
        5> perform the Random Access Resource selection procedure (see clause 5.1.2) after the backoff time.
    3> else (i.e. the RA_TYPE is set to 2-stepRA):
      4> if msgA-TransMax is applied (see clause 5.1.1a) and PREAMBLE_TRANSMISSION_COUNTER=msgA-TransMax+1:
        5> set the RA_TYPE to 4-stepRA;
        5> perform initialization of variables specific to Random Access type as specified in clause 5.1.1a;
        5> flush HARQ buffer used for the transmission of MAC PDU in the MSGA buffer;
        5> discard explicitly signalled contention-free 2-step RA type Random Access Resources, if any;
        5> perform the Random Access Resource selection as specified in clause 5.1.2.
      4> else:
        5> select a random backoff time according to a uniform distribution between 0 and the PREAMBLE_BACKOFF;
        5> if the criteria (as defined in clause 5.1.2a) to select contention-free Random Access Resources is met during the backoff time:
          6> perform the Random Access Resource selection procedure for 2-step RA type as specified in clause 5.1.2a.
        5> else:
          6> perform the Random Access Resource selection for 2-step RA type procedure (see clause 5.1.2a) after the backoff time.

5.1.6 Completion of the Random Access Procedure

Upon completion of the Random Access procedure, the MAC entity shall:
  1> discard any explicitly signalled contention-free Random Access Resources for 2-step RA type and 4-step RA type except the 4-step RA type contention-free Random Access Resources for beam failure recovery request, if any;
  1> flush the HARQ buffer used for transmission of the MAC PDU in the Msg3 buffer and the MSGA buffer.

Upon successful completion of the Random Access procedure initiated for DAPS handover, the target MAC entity shall:
  1> indicate the successful completion of the Random Access procedure to the upper layers.

3GPP TR 38.836 introduces the following:

4 Sidelink-Based UE-to-Network Relay 4.1 Scenarios, Assumptions and Requirements The UE-to-Network Relay enables coverage extension and power saving for the Remote UE. The coverage scenarios considered in this study are the following:
  UE-to-Network Relay UE is in coverage and Remote UE is out of coverage
  UE-to-Network Relay UE and Remote UE are both in coverage
  For L3 UE-to-Network Relay, relay UE and remote UE can be in the same cell or different cells, after remote UE establishes connection via Relay UE For L2 UE-to-Network Relay, it is supported as baseline that after remote UE connects via relay UE, relay UE and remote UE are controlled by the relay UE's serving cell For L2 UE-to-Network Relay, both cases below are supported, i.e.

Before remote connection via relay UE, relay UE and remote UE are in the same cell;

Before remote connection via relay UE, relay UE and remote UE are in different cells; The considered scenarios are reflected in FIGS. 4.1-1.

Figure 9:
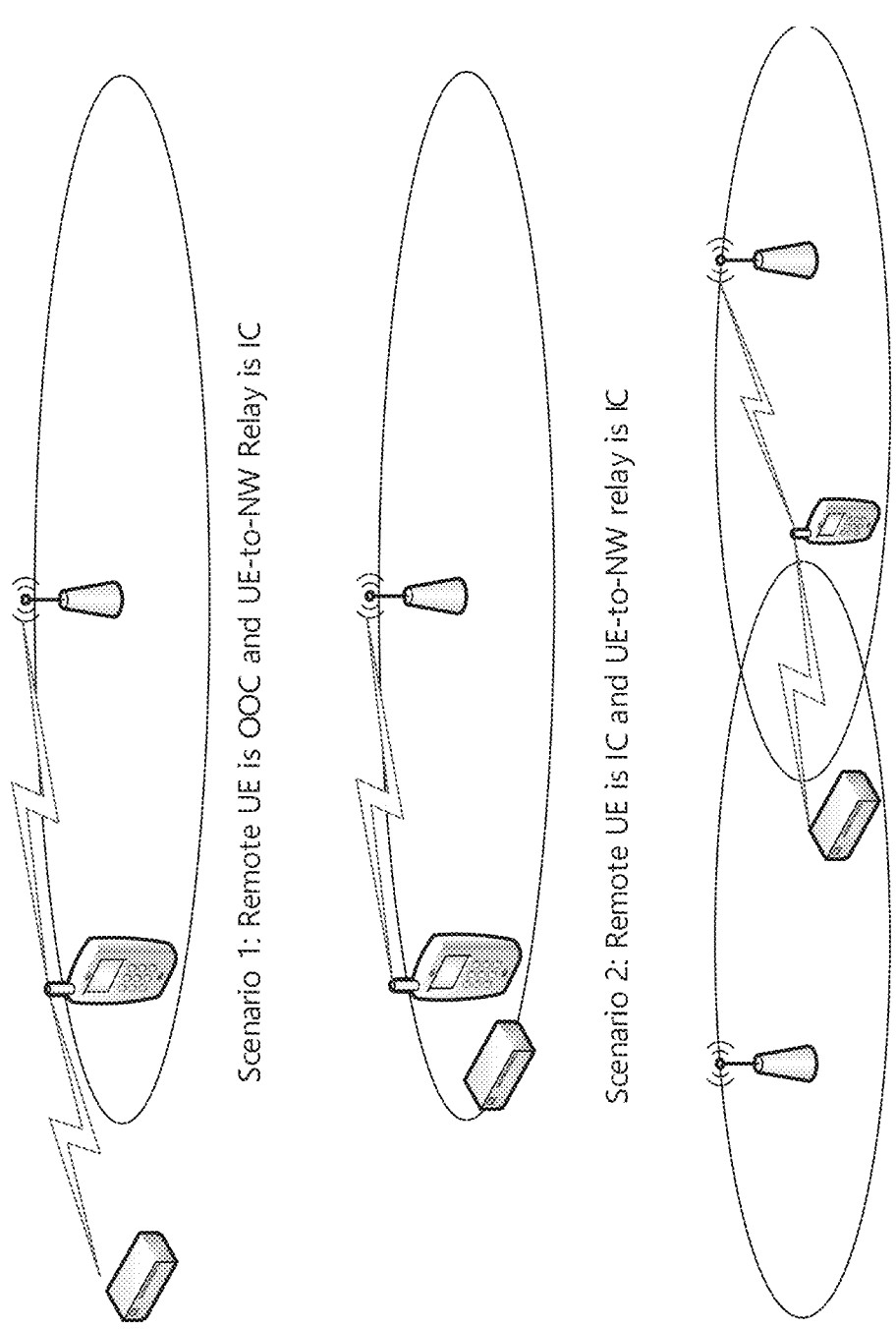
FIG. 9 is a reproduction of Figure 4.1-1 of 3GPP TR 38.836 V1.0.0.

Figure 4.1-1 of 3GPP TR 38.836 V1.0.0, Entitled "Scenarios for UE-to-Network Relay", is Reproduced as FIG. 9

NR Uu is assumed on the Uu link of the UE-to-Network Relay UE. NR sidelink is assumed on PC5 between the Remote UE(s) and the UE-to-Network Relay UE.
Cross-RAT configuration/control of UE (Remote UE or UE-to-Network Relay UE) is not considered, i.e., eNB/ng-eNB do not control/configure an NR Remote UE and UE-to-Network Relay UE. For UE-to-Network Relay, the study focuses on unicast data traffic between the Remote UE and the NW.
Configuring/scheduling of a UE (Remote UE or UE-to-Network Relay UE) by the SN to perform NR sidelink communication is out of scope of this study.
For UE-to-Network Relay, relaying of unicast data between the Remote UE and the network can occur after a PC5-RRC connection is established between the Relay UE and the Remote UE.
The Uu RRC state of the relay UE and Remote UE can change when connected via PC5. Both Relay UE and Remote UE can perform relay discovery in any RRC state. A Remote UE can perform relay discovery while out of Uu coverage.
A Relay UE must be in RRC_CONNECTED to perform relaying of unicast data.
For L2 UE-to-Network Relay:
　Remote UE(s) must be in RRC_CONNECTED to perform transmission/reception of relayed unicast data.
　The Relay UE can be in RRC_IDLE, RRC_INACTIVE or RRC_CONNECTED as long as all the PC5-connected Remote UE(s) are in RRC_IDLE.
　The Relay UE can be in RRC_INACTIVE or RRC_CONNECTED as long as all the PC5-connected Remote UE(s) are in RRC_INACTIVE.
For L3 UE-to-Network Relay, both Relay UE and Remote UE can be in RRC_INACTIVE state. The requirement of service continuity is only for UE-to-Network Relay, but not for UE-to-UE Relay in this release.
RAN2 have studied the mobility scenario of "between direct (Uu) path and indirect (via the relay) path" for UE-to-Network relay. RAN2 focus on the mobility scenarios of intra-gNB cases in the study phase, and assume the inter-gNB cases will also be supported. For the inter-gNB cases, compared to the intra-gNB cases, potential different parts on Uu interface in details can be studied either in the SI phase or in the WI phase. RAN2 deprioritize work specific to the mobility scenario of "between indirect (via a first relay UE) and indirect (via a second relay UE)" for path switching in the SI phase, which can be studied in the WI phase, if needed.
RAN2 deprioritize the group mobility scenario in the SI phase, which may be discussed in WI phase, if needed.

Figure 16:
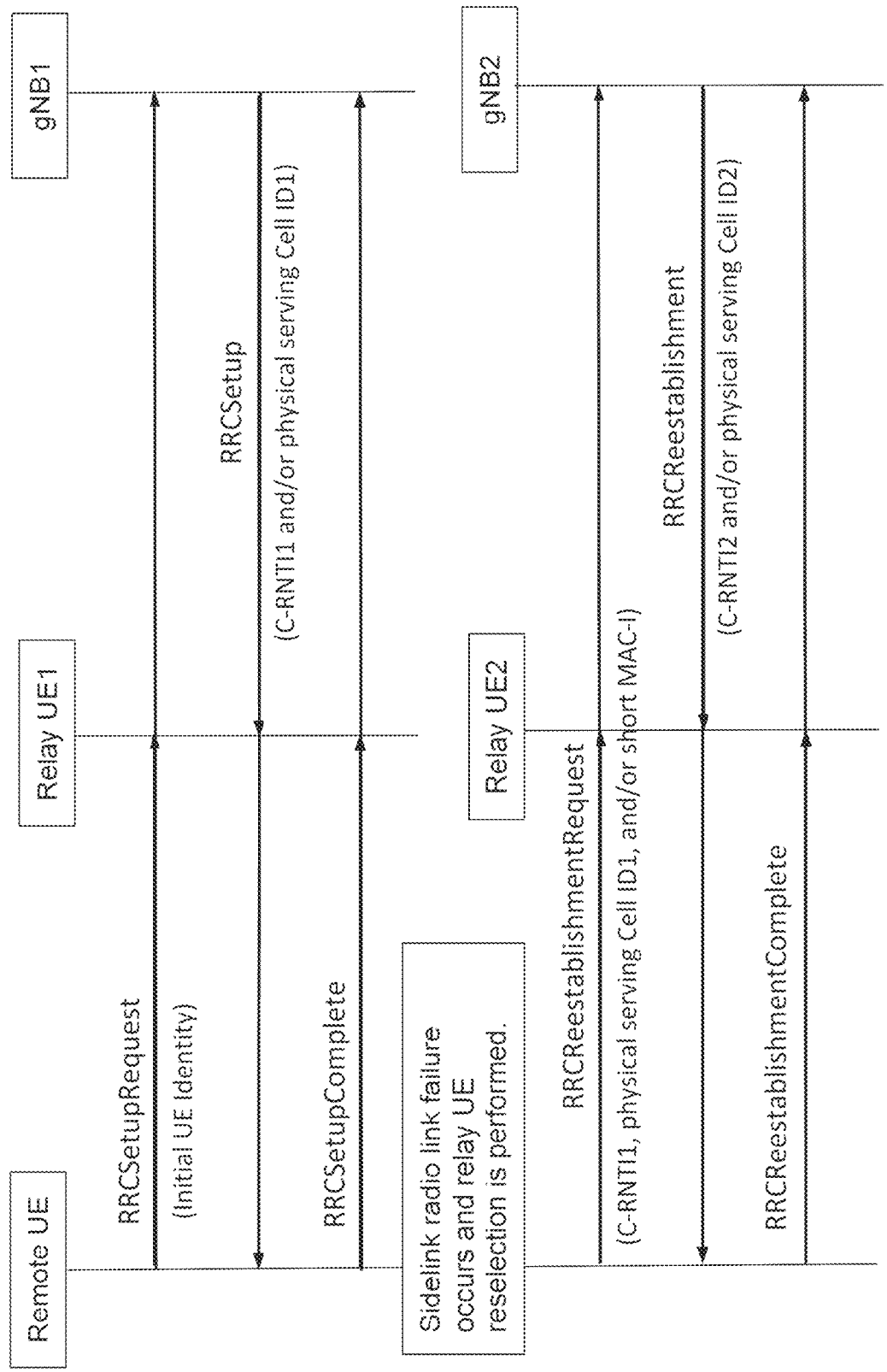
FIG. 16 is a step flow chart according to one exemplary embodiment.

4.2 Discovery
Model A and model B discovery model as defined in clause 5.3.1.2 of TS 23.303 [3] are taken as a working assumption for both UE-to-Network Relay and UE-to-UE Relay. The protocol stack of discovery message is similar or identical to PC5-S signalling as illustrated in Figure 16.9.2.1-2 of 38.300 [4].
For relay UE of UE-to-Network Relay,
　The Relay UE needs to be within a minimum and a maximum Uu signal strength threshold(s) if provided by gNB before it can transmit discovery message when in RRC_IDLE or in RRC_INACTIVE state.
　Relay UE is allowed to transmit discovery message based on NR sidelink communication configuration provided by gNB in all RRC states.
　Relay UE supporting L3 UE-to-Network Relay is allowed to transmit discovery message based on at least pre-configuration when it is connected to a gNB which is not capable of sidelink relay operation, in case its serving carrier is not shared with carrier for sidelink operation.
　Relay UE supporting L2 UE-to-Network Relay should be always connected to a gNB which is capable of sidelink relay operation t including providing configurations for transmission of discovery messages.
For remote UE of UE-to-Network Relay,
　The Remote UE in RRC_IDLE and RRC_INACTIVE state is allowed to transmit discovery message if measured signal strength of serving cell is lower than a configured threshold.
　Whether Remote UE in RRC_CONNECTED is allowed to transmit discovery is based on configuration provided by serving gNB.
　No additional network configuration is needed for Uu measurement by remote UE in RRC_IDLE or RRC_INACTIVE.
　Remote UE out of coverage is always allowed to transmit discovery message based on pre-configuration while not connected with network through a Relay UE yet.
　Remote UE supporting UE-to-Network Relay is allowed to transmit discovery message based on at least pre-configuration when it is directly connected to a gNB which is not capable of sidelink relay operation, in case its serving carrier is not shared with SL carrier.
　For Remote UE supporting L3 UE-to-Network Relay which is out of coverage and connected to a gNB indirectly, it is not feasible for the serving gNB to provide radio configuration to transmit discovery message.
The detailed definition of a gNB which is not capable of sidelink relay operation can be left for WI phase but at least should include the case that the gNB does not provide SL relay configuration, e.g., no discovery configuration.
Resource pool to transmit discovery message can be either shared with or separated from resource pool for data transmission.
　In case of shared resource pool, a new LCID is introduced for discovery message, i.e., discovery message is carried by a new SL SRB.
　Within separated resource pool, discovery messages are treated equally with each other during the LCP procedure.
Editor note: For Remote UE out of coverage, it is FFS whether transmission of discovery message is based on configuration from network if the Remote UE is already connected with network through a Relay UE.
Editor note: For Remote UE in RRC_CONNECTED, the detail of configuration provided by serving gNB is FFS.

4.3 Relay (Re-)Selection Criterion and Procedure

The baseline solution for relay (re-)selection is as follow:

Radio measurements at PC5 interface are considered as part of relay (re)selection criteria.

Remote UE at least use the radio signal strength measurements of sidelink discovery messages to evaluate whether PC5 link quality of a relay UE satisfies relay selection and reselection criterion.

When remote UE is connected to a relay UE, it may use SL-RSRP measurements on the sidelink unicast link to evaluate whether PC5 link quality with the relay UE satisfies relay reselection criterion.

Further details on the PC5 radio measurements criteria, e.g., in case of no transmission on the sidelink unicast link can be discussed in WI phase.

For relay (re-)selection, remote UE compares the PC5 radio measurements of a relay UE with the threshold which is configured by gNB or preconfigured. Higher layer criteria also need to be considered by remote UE for relay (re-)selection, but details can be left to SA2 to decide. Relay (re-)selection can be triggered by upper layers of remote UE.

Relay reselection should be triggered if the NR Sidelink signal strength of current Sidelink relay is below a (pre)configured threshold. Also, relay reselection may be triggered if RLF of PC5 link with current relay UE is detected by remote UE.

The above-described baseline for relay (re)selection apply to both L2 and L3 solutions. But for RRC_CONNECTED remote UE in L2 UE-to-Network Relay scenario, gNB decision on relay selection/reselection is considered in WI phase under the above baseline. Additional AS layer criteria can be considered in WI phase for both L2 and L3 UE-to-Network Relay solutions.

For relay (re-)selection, when remote UE has multiple suitable relay UE candidates which meet all AS-layer & higher layer criteria and remote UE need to select one relay UE by itself, it is up to remote UE implementation to choose one relay UE. This does not exclude gNB involvement in service continuity for UE-to-NW relay scenarios.

[ . . . ]

4.5 Layer-2 Relay

4.5.1 Architecture and Protocol Stack

4.5.1.1 Protocol Stack

The protocol stacks for the user plane and control plane of L2 UE-to-Network Relay architecture are described in Figure 4.5.1.1-1 and Figure 4.5.1.1-2 for the case where adaptation layer is not supported at the PC5 interface, and Figure 4.5.1.1-3 and Figure 4.5.1.1-4 for the case where adaptation layer is supported at the PC5 interface.

For L2 UE-to-Network Relay, the adaptation layer is placed over RLC sublayer for both CP and UP at the Uu interface between Relay UE and gNB. The Uu SDAP/PDCP and RRC are terminated between Remote UE and gNB, while RLC, MAC and PHY are terminated in each link (i.e. the link between Remote UE and UE-to-Network Relay UE and the link between UE-to-Network Relay UE and the gNB). Whether the adaptation layer is also supported at the PC5 interface between Remote UE and Relay UE is left to WI phase (assuming down-selection first before studying too much on the detailed PC5 adaptation layer functionalities).

Figure 10:
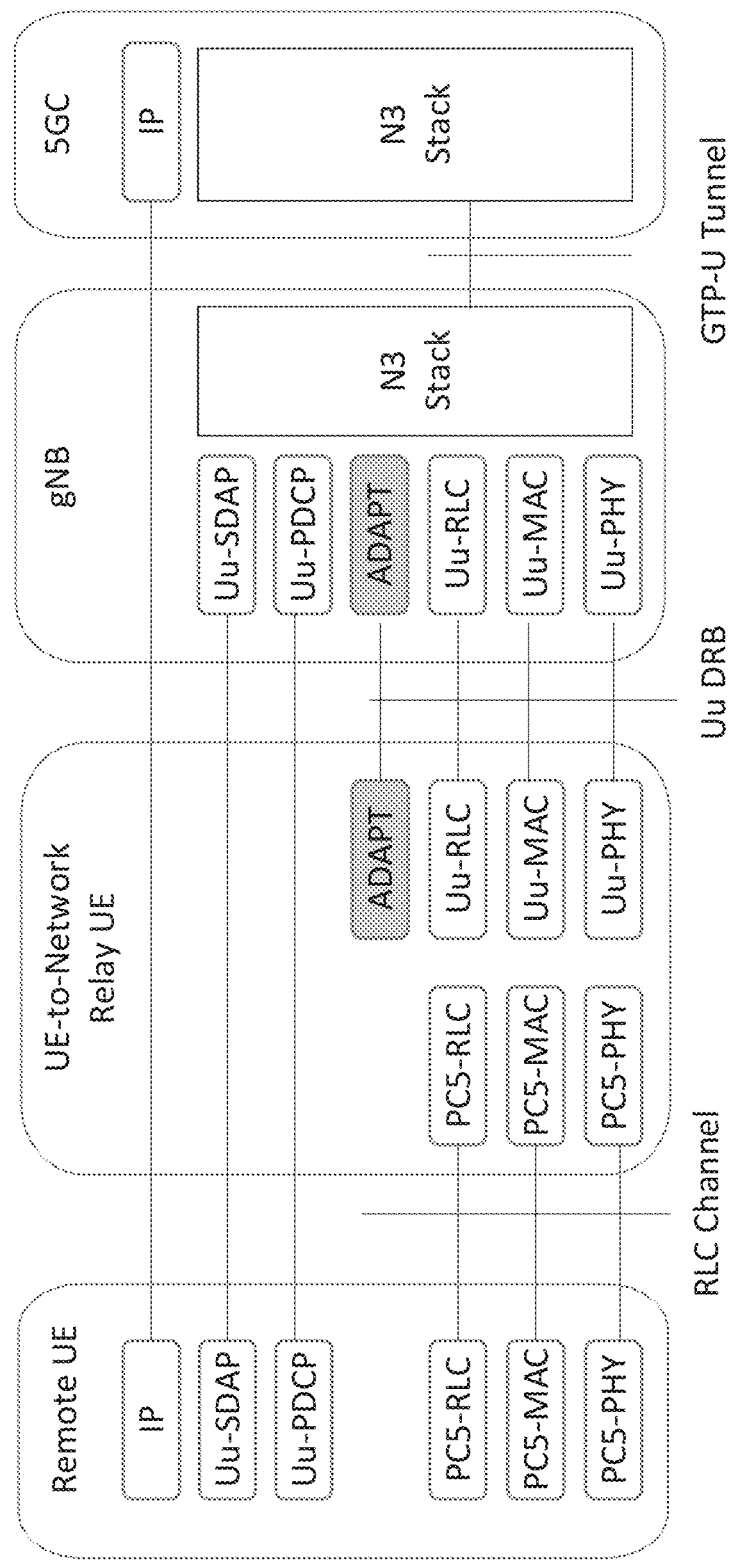
FIG. 10 is a reproduction of Figure 4.5.1.1-1 of 3GPP TR 38.836 V1.0.0.

Figure 4.5.1.1-1 of 3GPP TR 38.836 V1.0.0, Entitled "User Plane Protocol Stack for L2 UE-to-Network Relay (Adaptation Layer is not Supported at the PC5 Interface)", is Reproduced as FIG. 10

Figure 11:
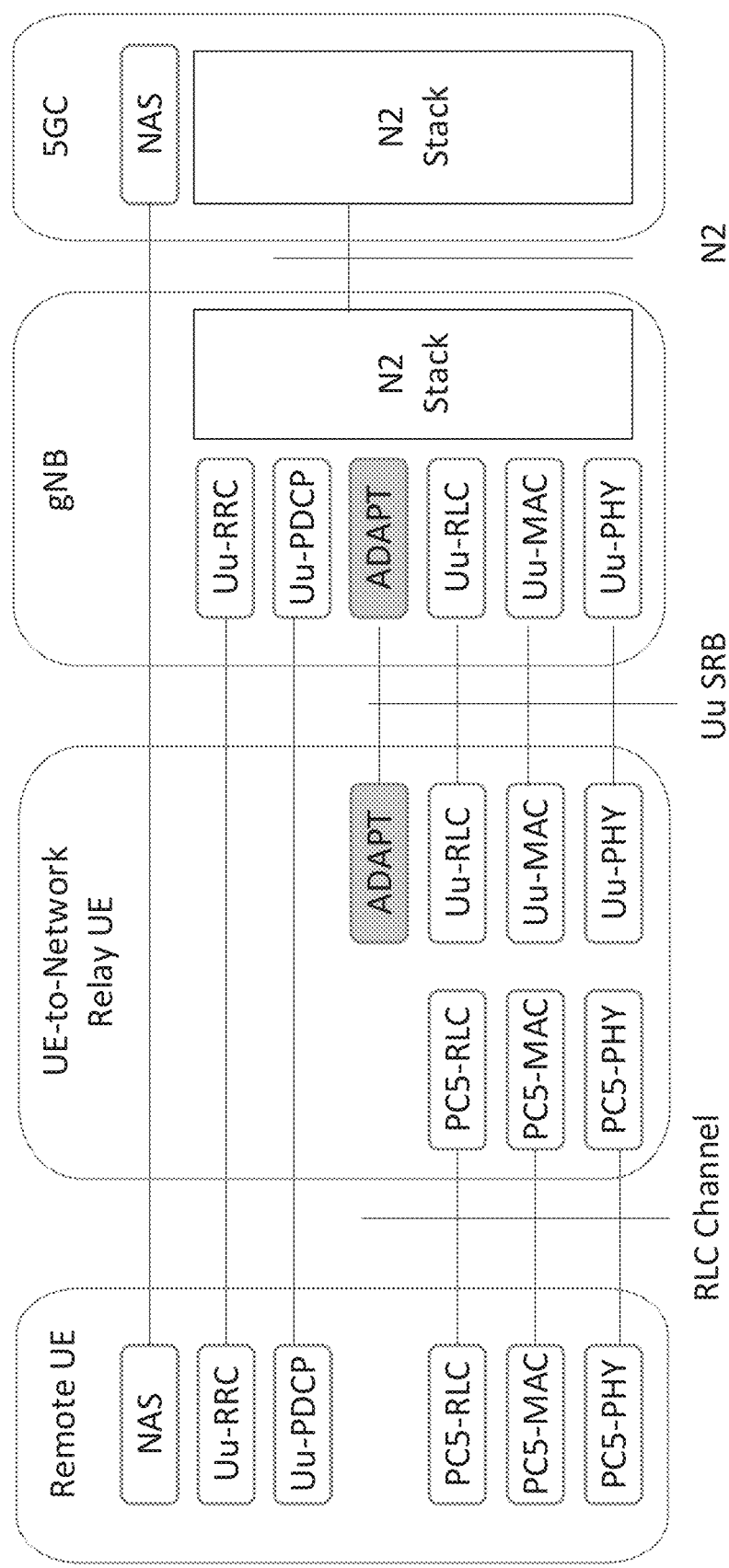
FIG. 11 is a reproduction of Figure 4.5.1.1-2 of 3GPP TR 38.836 V1.0.0.

Figure 4.5.1.1-2 of 3GPP TR 38.836 V1.0.0, Entitled "Control Plane Protocol Stack for L2 UE-to-Network Relay (Adaptation Layer is not Supported at the PC5 Interface)", is Reproduced as FIG. 11

Figure 12:
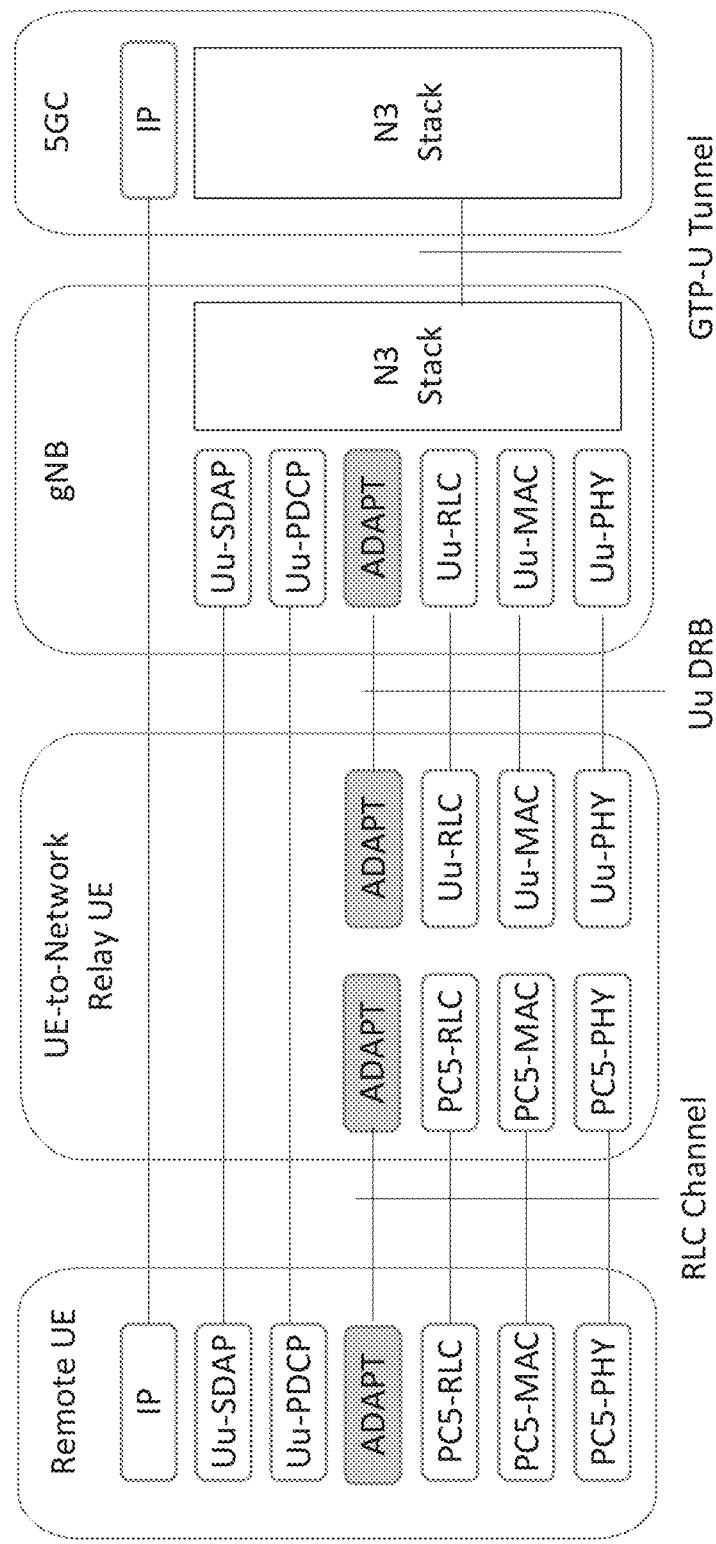
FIG. 12 is a reproduction of Figure 4.5.1.1-3 of 3GPP TR 38.836 V1.0.0.

Figure 4.5.1.1-3 of 3GPP TR 38.836 V1.0.0, Entitled "User Plane Protocol Stack for L2 UE-to-Network Relay (Adaptation Layer is Supported at the PC5 Interface)", is Reproduced as FIG. 12

Figure 13:
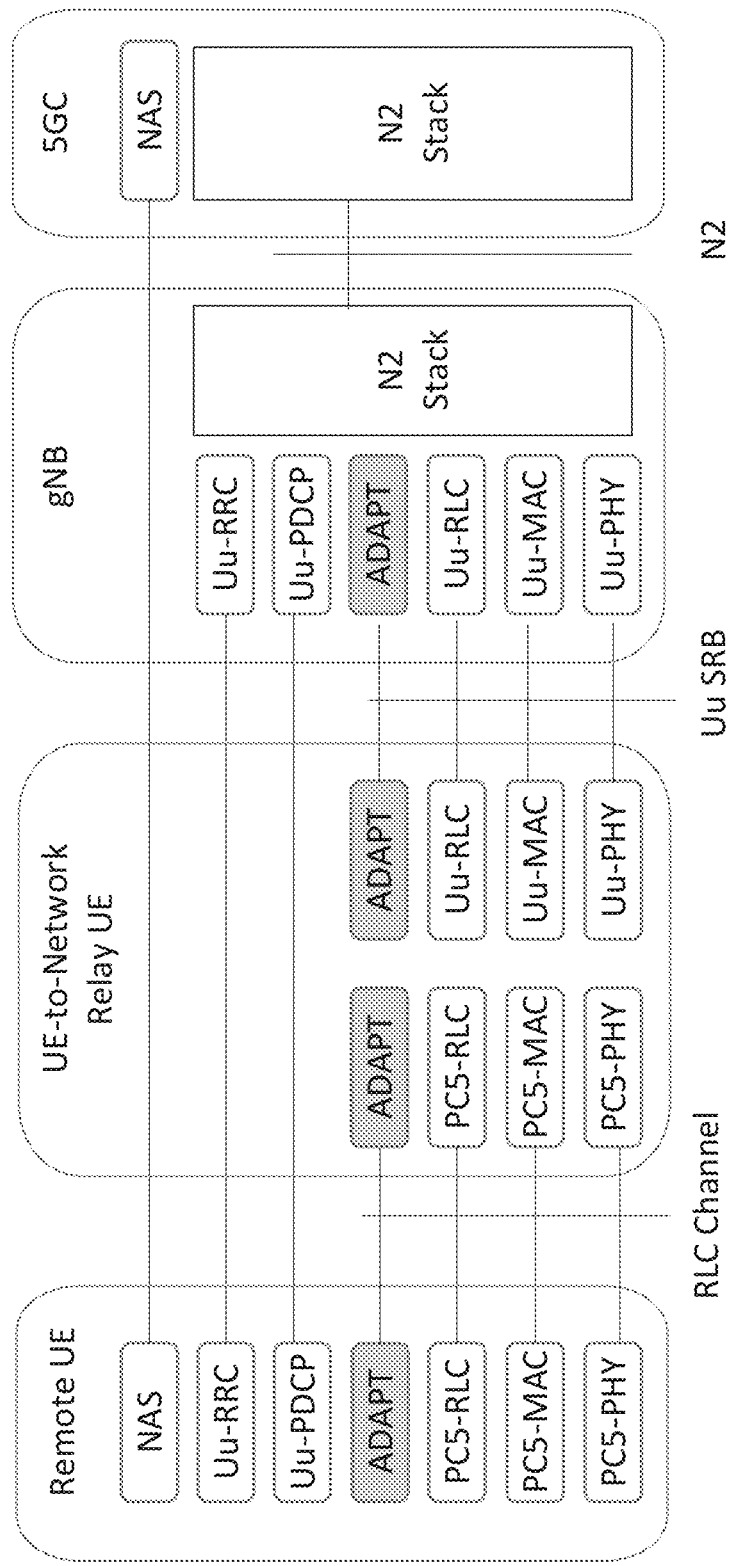
FIG. 13 is a reproduction of Figure 4.5.1.1-4 of 3GPP TR 38.836 V1.0.0.

Figure 4.5.1.1-4 of 3GPP TR 38.836 V1.0.0, Entitled "Control Plane Protocol Stack for L2 UE-to-Network Relay (Adaptation Layer is Supported at the PC5 Interface)", is Reproduced as FIG. 13

4.5.1.2 Adaptation Layer Functionality

For L2 UE-to-Network Relay, for uplink

The Uu adaptation layer at Relay UE supports UL bearer mapping between ingress PC5 RLC channels for relaying and egress Uu RLC channels over the Relay UE Uu path. For uplink relaying traffic, the different end-to-end RBs (SRB, DRB) of the same Remote UE and/or different Remote UEs can be subject to N:1 mapping and data multiplexing over one Uu RLC channel.

The Uu adaptation layer is used to support Remote UE identification for the UL traffic (multiplexing the data coming from multiple Remote UE). The identity information of Remote UE Uu Radio Bearer and Remote UE is included in the Uu adaptation layer at UL in order for gNB to correlate the received data packets for the specific PDCP entity associated with the right Remote UE Uu Radio Bearer of a Remote UE.

For L2 UE-to-Network Relay, for downlink

The Uu adaptation layer can be used to support DL bearer mapping at gNB to map end-to-end Radio Bearer (SRB, DRB) of Remote UE into Uu RLC channel over Relay UE Uu path. The Uu adaptation layer can be used to support DL N:1 bearer mapping and data multiplexing between multiple end-to-end Radio Bearers (SRBs, DRBs) of a Remote UE and/or different Remote UEs and one Uu RLC channel over the Relay UE Uu path.

The Uu adaptation layer needs to support Remote UE identification for Downlink traffic. The identity information of Remote UE Uu Radio Bearer and the identity information of Remote UE needs be put into the Uu adaptation layer by gNB at DL in order for Relay UE to map the received data packets from Remote UE Uu Radio Bearer to its associated PC5 RLC channel.

[ . . . ]

4.5.5 Control Plane Procedure

Editor Note: Service Continuity Related CP Procedure is Captured in 4.5.4.

4.5.5.1 Connection Management

Remote UE needs to establish its own PDU sessions/DRBs with the network before user plane data transmission.

PC5-RRC aspects of Rel-16 NR V2X PC5 unicast link establishment procedures can be reused to setup a secure unicast link between Remote UE and Relay UE for L2

UE-to-Network relaying before Remote UE establishes a Uu RRC connection with the network via Relay UE.

For both in-coverage and out-of-coverage cases, when the Remote UE initiates the first RRC message for its connection establishment with gNB, the PC5 L2 configuration for the transmission between the Remote UE and the UE-to-Network Relay UE can be based on the RLC/MAC configuration defined in specifications.

The establishment of Uu SRB1/SRB2 and DRB of the Remote UE is subject to legacy Uu configuration procedures for L2 UE-to-Network Relay.

Figure 14:
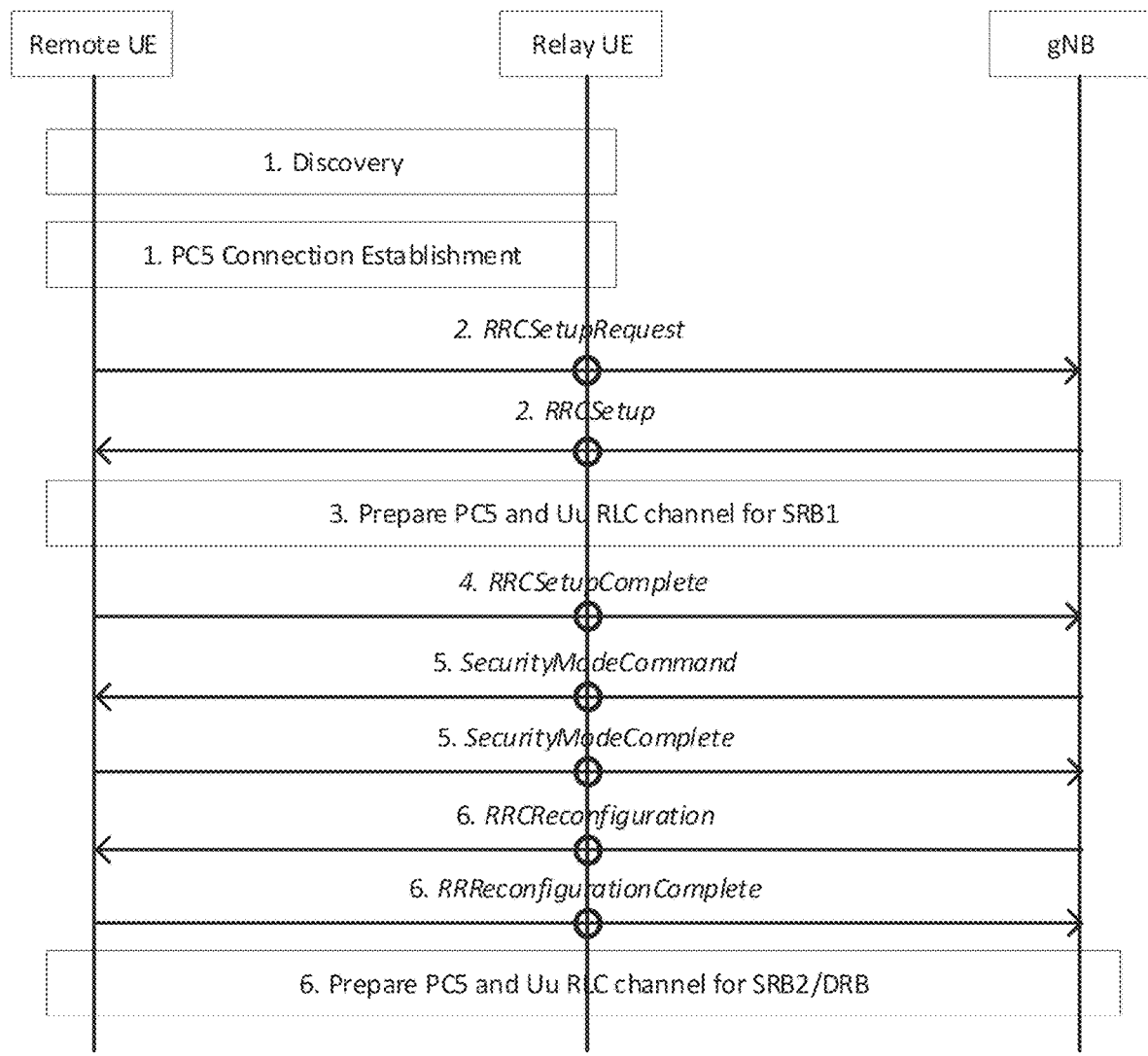
FIG. 14 is a reproduction of Figure 4.5.5.1-1 of 3GPP TR 38.836 V1.0.0.

The following high level connection establishment procedure applies to L2 UE-to-Network Relay:

Figure 4.5.5.1-1 of 3GPP TR 38.836 V1.0.0,
Entitled "Procedure for Remote UE Connection Establishment", is Reproduced as FIG. 14

Step 1. The Remote and Relay UE perform discovery procedure, and establish PC5-RRC connection using the legacy Rel-16 procedure as a baseline.

Step 2. The Remote UE sends the first RRC message (i.e., RRCSetupRequest) for its connection establishment with gNB via the Relay UE, using a default L2 configuration on PC5. The gNB responds with an RRCSetup message to Remote UE. The RRCSetup delivery to the Remote UE uses the default configuration on PC5. If the relay UE had not started in RRC_CONNECTED, it would need to do its own connection establishment as part of this step. The details for Relay UE to forward the RRCSetupRequest/RRCSetup message for Remote UE at this step can be discussed in WI phase.

Step 3. The gNB and Relay UE perform relaying channel setup procedure over Uu. According to the configuration from gNB, the Relay/Remote UE establishes an RLC channel for relaying of SRB1 towards the Remote UE over PC5. This step prepares the relaying channel for SRB1.

Step 4. Remote UE SRB1 message (e.g. an RRCSetupComplete message) is sent to the gNB via the Relay UE using SRB1 relaying channel over PC5. Then the Remote UE is RRC connected over Uu.

Step 5. The Remote UE and gNB establish security following legacy procedure and the security messages are forwarded through the Relay UE.

Step 6. The gNB sets up additional RLC channels between the gNB and Relay UE for traffic relaying. According to the configuration from gNB, the Relay/Remote UE sets up additional RLC channels between the Remote UE and Relay UE for traffic relaying. The gNB sends an RRCReconfiguration to the Remote UE via the Relay UE, to set up the relaying SRB2/DRBs. The Remote UE sends an RRCReconfigurationComplete to the gNB via the Relay UE as a response. Besides the connection establishment procedure, for L2 UE-to-Network relay, The RRC reconfiguration and RRC connection release procedures can reuse the legacy RRC procedure, with the message content/configuration design left to WI phase.

The RRC connection re-establishment and RRC connection resume procedures can reuse the legacy RRC procedure as baseline, by considering the above connection establishment procedure of L2 UE-to-Network Relay to handle the relay specific part, with the message content/configuration design left to WI phase.

3GPP TS 23.287 introduced the following:

6.3.3 Unicast Mode V2X Communication Over PC5 Reference Point 6.3.3.1 Layer-2 Link Establishment Over PC5 Reference Point To perform unicast mode of V2X communication over PC5 reference point, the UE is configured with the related information as described in clause 5.1.2.1.

Figure 6.3.3.1-1 shows the layer-2 link establishment procedure for unicast mode of V2X communication over PC5 reference point.

Figure 15:
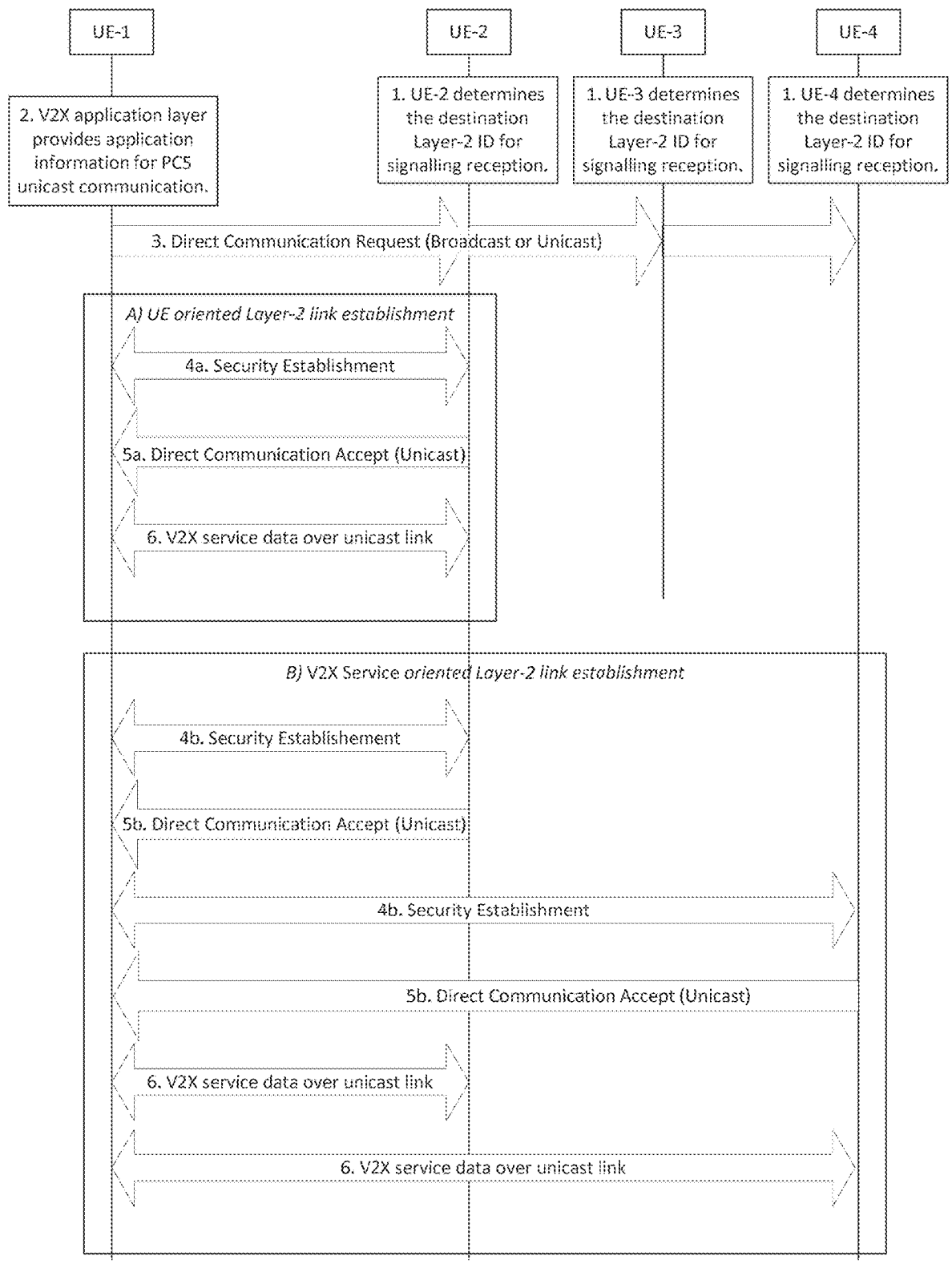
FIG. 15 is a reproduction of Figure 6.3.3.1-1 of 3GPP TS 23.287 V16.4.0.

Figure 6.3.3.1-1 of 3GPP TS 23.287 V16.4.0,
Entitled "Layer-2 Link Establishment Procedure", is Reproduced as FIG. 15

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.

2. The V2X application layer in UE-1 provides application information for PC5 unicast communication. The application information includes the V2X service type(s) and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.

3. UE-1 sends a Direct Communication Request message to initiate the unicast layer-2 link establishment procedure. The Direct Communication Request message includes:

Source User Info: the initiating UE's Application Layer ID (i.e. UE-Vs Application Layer ID).

If the V2X application layer provided the target UE's Application Layer ID in step 2, the following information is included:

Target User Info: the target UE's Application Layer ID (i.e. UE-2's Application Layer ID).

V2X Service Info: the information about V2X service type(s) requesting Layer-2 link establishment.

Security Information: the information for the establishment of security.

NOTE 1: The Security Information and the necessary protection of the Source User Info and Target User Info are defined in TS 33.536 [26].

The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced V2X service type(s) over a PC5 unicast link with UE-1 responds by establishing the security with UE-1.

NOTE 2: The signalling for the Security Procedure is defined in TS 33.536 [26].

When the security protection is enabled, UE-1 sends the following information to the target UE:

If IP communication is used:
  IP Address Configuration: For IP communication, IP address configuration is required for this link and indicates one of the following values:
    "IPv6 Router" if IPv6 address allocation mechanism is supported by the initiating UE, i.e., acting as an IPv6 Router; or
    "IPv6 address allocation not supported" if IPv6 address allocation mechanism is not supported by the initiating UE.
  Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s) to be added. For each PC5 QoS Flow, the PFI, the corresponding PC5 QoS parameters (i.e. PQI and conditionally other parameters such as MFBR/GFBR, etc.) and the associated V2X service type(s).

The source Layer-2 ID used for the security establishment procedure is determined as specified in clauses 5.6.1.1 and 5.6.1.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:
  5a. (UE oriented Layer-2 link establishment) If the Target User Info is included in the Direct Communication Request message, the target UE, i.e. UE-2 responds with a Direct Communication Accept message if the Application Layer ID for UE-2 matches.
  5b. (V2X Service oriented Layer-2 link establishment) If the Target User Info is not included in the Direct Communication Request message, the UEs that are interested in using the announced V2X Service(s) respond to the request by sending a Direct Communication Accept message (UE-2 and UE-4 in Figure 6.3.3.1-1).

The Direct Communication Accept message includes:
  Source User Info: Application Layer ID of the UE sending the Direct Communication Accept message.
  QoS Info: the information about PC5 QoS Flow(s) requested by UE-1. For each PC5 QoS Flow, the PFI, the corresponding PC5 QoS parameters (i.e. PQI and conditionally other parameters such as MFBR/GFBR, etc.) and the associated V2X service type(s).

If IP communication is used:
    IP Address Configuration: For IP communication, IP address configuration is required for this link and indicates one of the following values:
      "IPv6 Router" if IPv6 address allocation mechanism is supported by the target UE, i.e., acting as an IPv6 Router; or
      "IPv6 address allocation not supported" if IPv6 address allocation mechanism is not supported by the target UE.
    Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.
  If both UEs (i.e. the initiating UE and the target UE) selected to use link-local IPv6 address, they shall disable the duplicate address detection defined in RFC 4862 [21].

NOTE 3: When either the initiating UE or the target UE indicates the support of IPv6 router, corresponding address configuration procedure would be carried out after the establishment of the layer 2 link, and the link-local IPv6 addresses are ignored.

The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID) and the corresponding PC5 QoS parameters. This enables the AS layer to maintain the PC5 Link Identifier together with the PC5 unicast link related information.

6. V2X service data is transmitted over the established unicast link as below:
  The PC5 Link Identifier, and PFI are provided to the AS layer, together with the V2X service data.
  Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the V2X service data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the V2X service data to UE-1 over the unicast link with UE-1.

UE-to-Network Relay communication is studied for UE to access network via indirect network communication. Basically, Rel-16 5G architectural design (e.g. flow-based QoS communication over PC5/Uu interface) could be taken into consideration. In the scenario of UE-to-Network relay communication, a remote UE would access the network (e.g. 5GC) via a relay UE where the remote UE could be out-of-coverage while the relay UE would be in-coverage. The remote UE would communicate with the relay UE via PC5 interface (or called sidelink interface) for accessing the network, while the relay UE would communicate with a base station (e.g. gNB) via Uu interface for forwarding traffic between the remote UE and the network.

According to 3GPP TS 38.331 V16.2.0, when a UE in RRC_CONNECTED performs a RRC connection reestablishment procedure (due to e.g. handover failure, radio link failure, etc.), the UE transmits a RRC reestablishment request message for re-establishing a RRC connection (e.g. RRCReestablishmentRequest) on a cell to a gNB. The UE performs Cell Selection to select the cell (among prepared cells including the original serving cell or a target cell in which the UE is in handover to) before sending the RRC reestablishment request message. In the RRC reestablishment request message, a Cell Radio Network Temporary Identifier (C-RNTI) of the UE is included. The C-RNTI of the UE could be used in the UE's serving cell in which the trigger for the re-establishment occurred. Besides, the Radio Resource Control (RRC) reestablishment request message could also include a physical cell identity. The physical cell identity could be used to identify the serving cell in which the trigger for the re-establishment occurred. The physical cell identity could be obtained by the UE from system information broadcasted by the gNB. In addition, the RRC reestablishment request message could also include a shortMAC-I. The shortMAC-I could be calculated by a security key (e.g. $K_{RRCint}$) and/or a security algorithm (for integrity protection) used in the serving cell in which the trigger for the re-establishment occurred. The security algorithm could be indicated in a security command message (e.g. SecurityModeCommand) received from the gNB. The UE could derive the security key and associate the security key with the security algorithm. The security command message could be received before the UE initiates the RRC connection reestablishment procedure.

Normally, in scenario of UE communicating with gNB directly, the UE obtains the C-RNTI during a random access procedure (as introduced in 3GPP TS 38.321 V16.2.1) performed for a RRC connection establishment procedure. When the UE performs the RRC connection establishment procedure, the UE sends a RRC setup request message (e.g. RRCSetupRequest) to a gNB via the random access procedure. According to 3GPP TS 38.321 V16.2.1, the UE sends a Msg1 (i.e. random access preamble) to the gNB and then receives a Msg2 (i.e. random access response) from the gNB. In the Msg2, a temporary C-RNTI and a RAR grant are included. The UE uses the RAR grant to send a Msg3 including the RRC setup request message to the gNB. If the UE receives a Msg4 from the gNB based on the temporary C-RNTI and contention resolution of the random access procedure is successful (i.e. the content of Msg4 matches the content of Msg3), then the UE stores the temporary C-RNTI as a C-RNTI. This C-RNTI could be used to construct the content of the RRC reestablishment request message as mentioned above.

In the scenario of UE-to-Network relay communication (i.e. in scenario of UE communicating with gNB indirectly), a remote UE communicates with gNB via a relay UE. The remote UE cannot obtain such C-RNTI from the gNB since the remote UE does not perform such random access procedure with the gNB. Thus, some manner for provisioning information (e.g. C-RNTI, physical cell identity, etc.) used to construct the content of the RRC reestablishment request message to the remote UE should be considered.

Basically, the remote UE would need to establish a RRC connection with the gNB via the relay UE. The remote UE could send a RRC setup request message for request of a RRC connection establishment with the gNB to the relay UE, and the relay UE could then forward the RRC setup request message to the gNB. In response to receipt of the RRC setup request message, the gNB could respond a RRC setup message (e.g. RRCSetup) for the RRC connection establishment. The gNB could send the RRC setup message to the relay UE, and the relay UE could then forward this message to the remote UE. Upon receipt of the RRC setup message, the remote UE could comply with the configurations included in the RRC setup message (as introduced in 3GPP TS 38.331 V16.2.0). Possibly, the RRC setup message could further include a C-RNTI for the remote UE. The remote UE could then send a RRC setup complete message (e.g. RRCSetupComplete) in response to receipt of the RRC setup message to the relay UE, and the relay UE could then forward the RRC setup complete message to the gNB.

Figure 17:
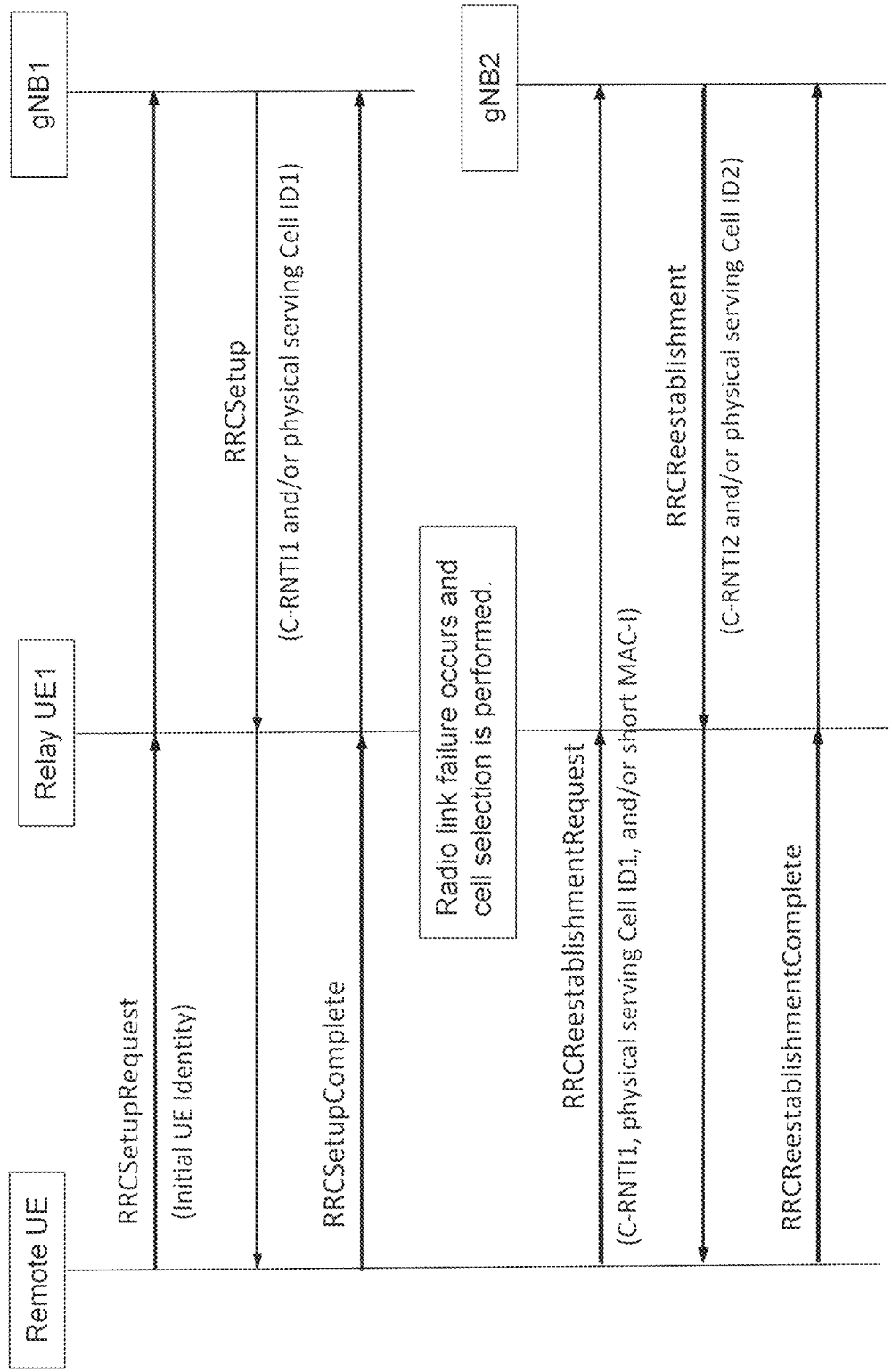
FIG. 17 is a step flow chart according to one exemplary embodiment.

FIGS. 16 and 17 show two examples of the invention. After sidelink radio link failure, the remote UE may perform relay reselection. A new serving cell and a new relay UE may be selected. It is possible the original relay UE may be selected again. On the other hand, it is also possible that radio link failure may occur on the Uu radio link between the relay UE and the original gNB (while the PC5 connection between the relay UE and the remote UE is still available). In this situation, the relay UE may perform cell (re)selection. For both situations, the remote UE may initiate a RRC connection reestablishment procedure. The remote UE may send a RRC reestablishment request message to the new serving cell or gNB. The RRC reestablishment request message could be sent to the new serving cell or gNB directly or via the original relay UE or the new relay UE. A RRC re-establishment message (corresponding to the RRC reestablishment request message) from the new serving cell or gNB may include a new C-RNTI (and optionally a new physical cell identity) for the remote UE to use after the RRC connection reestablishment procedure is completed. It is noted that the remote UE could establish a new PC5 connection with the new relay UE before sending the RRC reestablishment request message to the new serving cell or gNB via the new relay UE. And, the PC5 connection may be a PC5 RRC connection or a PC5 unicast link.

More specifically, the remote UE could send the RRC setup request message on SRB0. The SRB0 could be associated with one PC5 Radio Link Control (RLC) channel. Thus, the RRC setup request message could be delivered to this PC5 RLC channel for transmission to the relay UE. The association between the SRB0 and this PC5 RLC channel could be pre-defined or pre-configured in the remote UE and the relay UE. In the relay UE aspect, the relay UE could send the RRC setup request message on one Uu RLC channel associated with the PC5 RLC channel on which the RRC setup request message is received. The association between this Uu RLC channel and the SRB0 of the remote UE could be pre-defined or pre-configured in the relay UE or configured by the gNB.

More specifically, the gNB could send the RRC setup message on the SRB0 of the remote UE. The RRC setup message could be delivered to the Uu RLC channel associated with the SRB0 of the remote UE for transmission to the relay UE. In the relay UE aspect, the relay UE could send the RRC setup message on the PC5 RLC channel associated with this Uu RLC channel for transmission to the remote UE.

More specifically, the remote UE could establish SRB1 in response to reception of the RRC setup message. The remote UE could send the RRC setup complete message on the SRB1. The SRB1 could be associated with one PC5 RLC channel. Thus, the RRC setup complete message could be delivered to this PC5 RLC channel for transmission to the relay UE. The association between the SRB1 of the remote UE and this PC5 RLC channel could be pre-defined or pre-configured in the remote UE and the relay UE. In the relay UE aspect, the relay UE could send the RRC setup complete message to the gNB on one Uu RLC channel associated with the PC5 RLC channel on which the RRC setup complete message is received. The association between this Uu RLC channel and the SRB1 of the remote UE could be pre-defined or pre-configured in the relay UE or configured by the gNB.

In order to activate AS security protection for protecting traffic and/or signalling exchanged between the remote UE and the gNB, the gNB may send a security mode command message (e.g. SecurityModeCommand) to the relay UE, and the relay UE could then forward the security mode command message to the remote UE. Upon receipt of the security mode command message, the remote UE could derive security key and configure lower layers (e.g. PDCP) for applying integrity protection and/or ciphering. And then, the remote UE could send a security mode complete message (e.g. SecurityModeComplete) to the relay UE, and the relay UE could then forward the security mode complete message to the gNB for completing the AS security protection activation. Alternative to providing a C-RNTI for the remote UE in the RRC setup message, the C-RNTI could also be provided for the remote UE in the security mode command message.

More specifically, the gNB could send the security mode command message on the SRB1 of the remote UE. The security mode command message could be delivered to the Uu RLC channel associated with the SRB1 of the remote UE for transmission to the relay UE. In the relay UE aspect, the relay UE could send the security mode command message on the PC5 RLC channel associated with this Uu RLC channel for transmission to the remote UE.

More specifically, the remote UE could send the security mode complete message on the SRB1. The security mode complete message could be delivered to the PC5 RLC channel associated with the SRB1 of the remote UE for transmission to the relay UE. In the relay UE aspect, the relay UE could send the security mode complete message to the gNB on the Uu RLC channel associated with the PC5 RLC channel on which the security mode complete message is received.

The gNB could further establish one or more DRBs with the remote UE for communicating traffic. Thus, the gNB could send a RRC reconfiguration message (e.g. RRCReconfiguration) for establishing these DRBs to the relay UE, and the relay UE could then forward the RRC reconfiguration message to the remote UE. Since the RRC setup message and the security mode command message are not sent with ciphering, it would be better to alternatively provide a C-RNTI to the remote UE with security protection. Thus, a C-RNTI for the remote UE could be included in a RRC reconfiguration message. This RRC reconfiguration including a C-RNTI for the remote UE could be sent to the remote UE after the AS security protection is activated.

More specifically, the gNB could send the RRC reconfiguration message on the SRB1 of the remote UE. The RRC reconfiguration message could be delivered to the Uu RLC channel associated with the SRB1 of the remote UE for transmission to the relay UE. In the relay UE aspect, the relay UE could send the RRC reconfiguration message on the PC5 RLC channel associated with this Uu RLC channel for transmission to the remote UE.

More specifically, the remote UE could respond the gNB with a RRC reconfiguration complete message in response to receipt of the RRC reconfiguration message. The remote UE could send the RRC reconfiguration message on the SRB1. The RRC reconfiguration complete message could be delivered to the PC5 RLC channel associated with the SRB1 of the remote UE for transmission to the relay UE. In the relay UE aspect, the relay UE could send the RRC reconfiguration complete message to the gNB on the Uu RLC channel associated with the PC5 RLC channel on which the RRC reconfiguration complete message is received.

Figure 18:
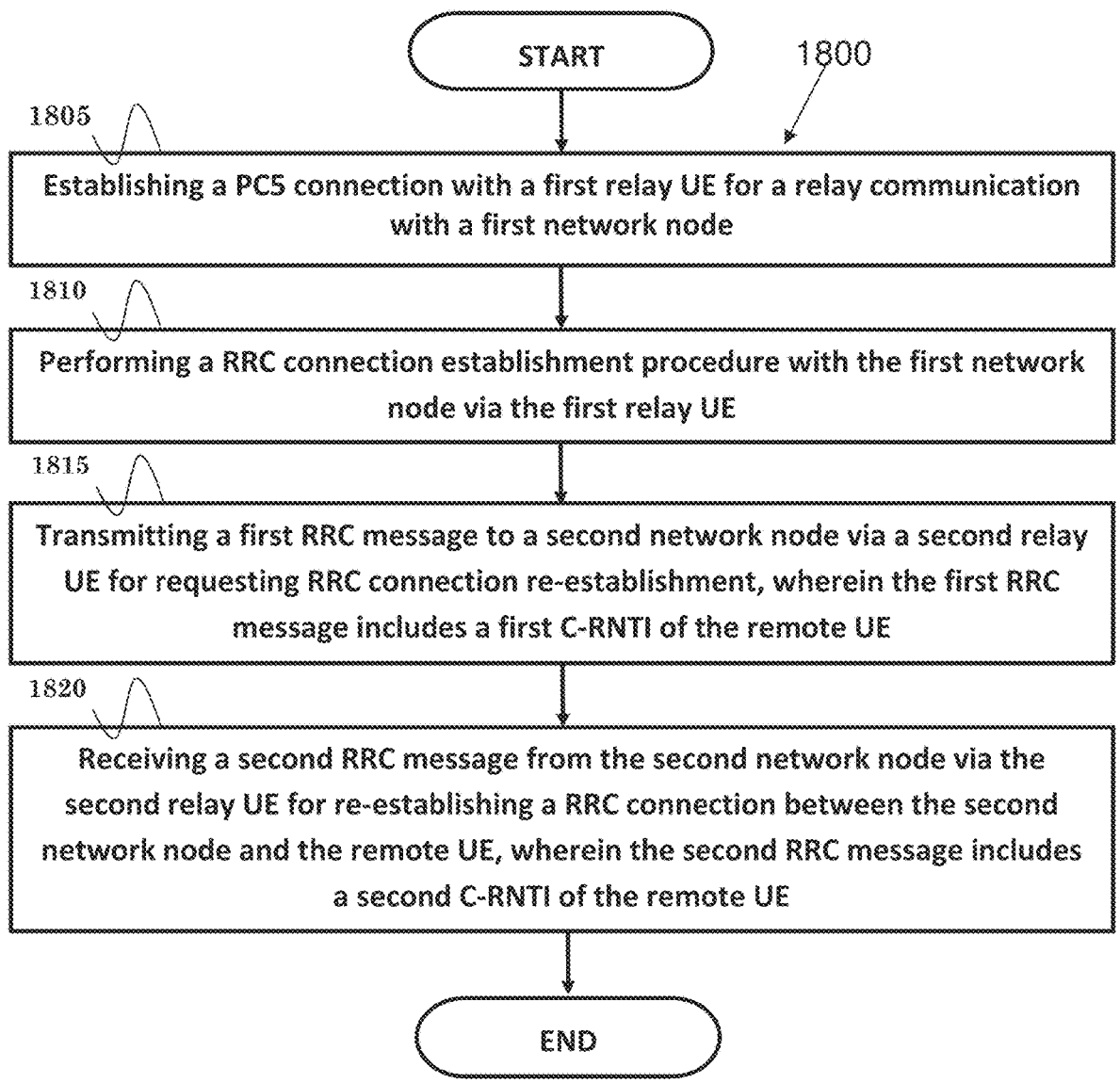
FIG. 18 is a flow chart according to one exemplary embodiment.

FIG. 18 is a flow chart 1800 illustrating a method for a remote UE to support UE-to-Network relay communication. In step 1805, the remote UE establishes a PC5 connection with a first relay UE for a relay communication with a first network node. In step 1810, the remote UE performs a RRC connection establishment procedure with the first network node via the first relay UE. In step 1815, the remote UE transmits a first RRC message to a second network node via a second relay UE for requesting RRC connection re-establishment, wherein the first RRC message includes a first C-RNTI of the remote UE. In step 1820, the remote UE receives a second RRC message via the second relay UE from the second network node for re-establishing a RRC connection between the second network node and the remote UE, wherein the second RRC message includes a second C-RNTI of the remote UE.

In one embodiment, the remote UE could transmit a third RRC message for request of establishing a RRC connection between the first network node and the remote UE to the first network node via the first relay UE. The remote UE could also receive a fourth RRC message for establishing the RRC connection between the first network node and the remote UE from the first network node via the first relay UE. The first C-RNTI of the remote UE could be included in the fourth RRC message.

In one embodiment, the remote UE could send the first RRC message to the second network node if the remote UE initiates a RRC connection reestablishment procedure, if the remote UE reselects a new relay UE, or if the first relay UE declares a radio link failure on a Uu link with the first network node.

In one embodiment, the first network node could be the same as the second network node. The first or second network node could be a base station (e.g. gNB). The first relay UE could be the same as the second relay UE. The first RRC message could a RRCReestablishmentRequest message; the second RRC message could be a RRCReestablishment message; the third RRC message could be a RRCSetupRequest message; and the fourth RRC message could be a RRCSetup message. And, the PC5 connection may be a PC5 RRC connection or a PC5 unicast link.

Referring back to FIGS. 3 and 4, in one exemplary embodiment of a method for a remote UE to support UE-to-Network relay communication, the remote UE 300 includes a program code 312 stored in the memory 310. The CPU 308 could execute program code 312 to enable the remote UE (i) to establish a PC5 connection with a first relay UE for a relay communication with a first network node, (ii) to perform a RRC connection establishment procedure with the first network node via the first relay UE, (iii) to transmit a first RRC message to a second network node via a second relay UE for requesting RRC connection re-establishment, wherein the first RRC message includes a first C-RNTI of the remote UE, and (iv) to receive a second RRC message from the second network node via the second relay UE for re-establishing a RRC connection between the second network node and the remote UE, wherein the second RRC message includes a second C-RNTI of the remote UE.

Furthermore, the CPU 308 can execute the program code 312 to perform all of the above-described actions and steps or others described herein.

Figure 19:
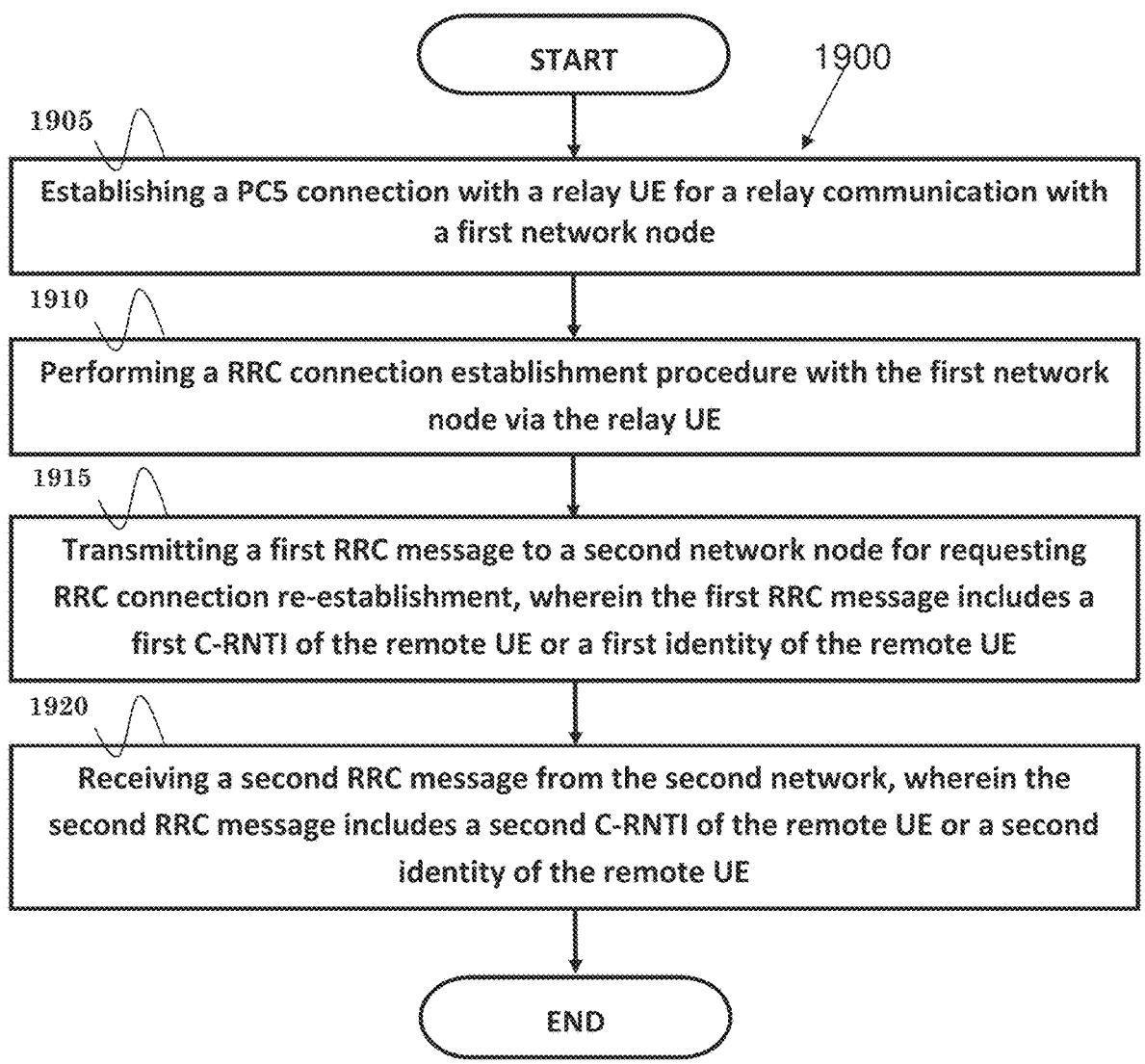
FIG. 19 is a flow chart according to one exemplary embodiment.

FIG. 19 is a flow chart 1900 illustrating a method for a remote UE to support UE-to-Network relay communication. In step 1905, the remote UE establishes a PC5 connection with a relay UE for a relay communication with a first network node. In step 1910, the remote UE performs a RRC connection establishment procedure with the first network node via the relay UE. In step 1915, the remote UE transmits a first RRC message to a second network node for requesting RRC connection re-establishment, wherein the first RRC message includes a first C-RNTI of the remote UE or a first identity of the remote UE. In step 1920, the remote UE receives a second RRC message from the second network, wherein the second RRC message includes a second C-RNTI of the remote UE or a second identity of the remote UE.

In one embodiment, the remote UE could receive the first C-RNTI of the remote UE or the first identity of the remote UE from the first network node via the relay UE during the RRC connection establishment procedure.

In one embodiment, the remote UE could transmit a first PC5-S message for request of establishing the PC5 connection to the relay UE. The remote UE could receive a second PC5-S message for acceptation of establishing the PC5 connection from the relay UE. The remote UE could transmit a third RRC message for request of establishing a RRC connection between the first network node and the remote UE to the first network node via the relay UE. The remote UE could receive a fourth RRC message for establishing the RRC connection with the first network node from the first network node via the relay UE. The remote UE could transmit a fifth RRC message for completion of establishing the RRC connection with the first network node to the first network node via the relay UE. The remote UE could enter a RRC_CONNECTED if the RRC connection with the first network node is completed. And, the PC5 connection may be a PC5 RRC connection or a PC5 unicast link.

In one embodiment, the first C-RNTI or the first identity of the remote UE may be included in the fourth RRC message. The remote UE could send the first RRC message to the second network node if the remote UE initiates a RRC connection reestablishment procedure, if the remote UE reselects a new relay UE, or if the current relay UE serving the remote UE declares a radio link failure on a Uu link with the first network node.

In one embodiment, the first RRC message could be transmitted to the second network node directly or via the relay UE or a second relay UE. The second RRC message could be received from the second network node directly or via the relay UE or a second relay UE. The second RRC message could be used for re-establishing a RRC connection with the second network node.

In one embodiment, the first RRC message could include a first physical cell identity (PhysCellId). The first physical cell identity could be included in the fourth RRC message. The first physical cell identity could also be included in a system information (e.g. Minimum SI) forwarded by the relay UE from the first network node.

In one embodiment, the second RRC message could include a second physical cell identity (PhysCellId). The second physical cell identity could be included in a system information (e.g. Minimum SI) forwarded by the relay UE or the second relay UE from the second network node.

In one embodiment, the first network node may be the same as the second network node. The first or second network node may be a base station (e.g. gNB).

In one embodiment, the first PC5-S message may be a Direct Communication Request message. The second PC5-S message may be a Direct Communication Accept message. The third RRC message may be a RRCSetupRequest message. The fourth RRC message may be a RRCSetup message. The fifth RRC message may be a RRCSetupComplete message.

In one embodiment, the first RRC message may be a RRCReestablishmentRequest message. The second RRC message may be a RRCReestablishment message.

Referring back to FIGS. 3 and 4, in one exemplary embodiment of a method for a remote UE to support UE-to-Network relay communication, the remote UE 300 includes a program code 312 stored in the memory 310. The CPU 308 could execute program code 312 to enable the remote UE (i) to establish a PC5 connection with a relay UE for a relay communication with a first network node, (ii) to perform a RRC connection establishment procedure with the first network node via the relay UE, (iii) to transmit a first RRC message to a second network node for requesting RRC connection re-establishment, wherein the first RRC message includes a first C-RNTI of the remote UE or a first identity of the remote UE, and (iv) to receive a second RRC message from the second network, wherein the second RRC message includes a second C-RNTI of the remote UE or a second identity of the remote UE.

Furthermore, the CPU 308 can execute the program code 312 to perform all of the above-described actions and steps or others described herein.

Figure 20:
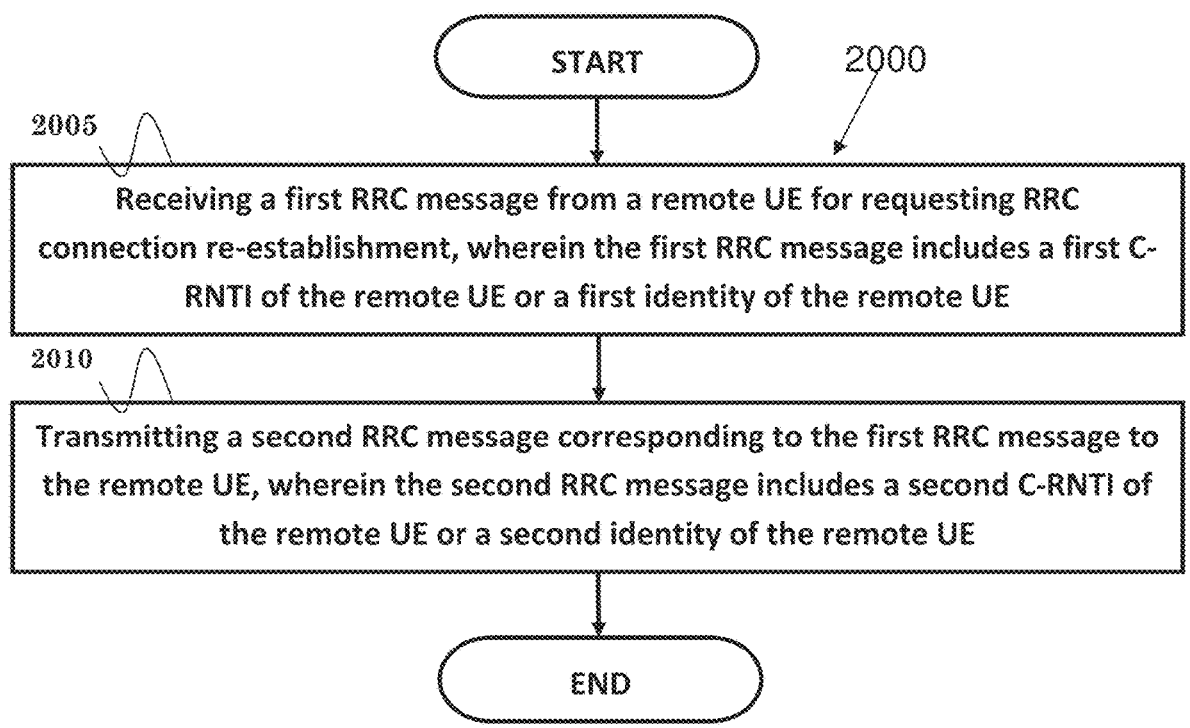
FIG. 20 is a flow chart according to one exemplary embodiment.

FIG. 20 is a flow chart 2000 illustrating a method for a second network node to support UE-to-Network relay communication. In step 2005, the second network node receives a first RRC message from a remote UE for requesting RRC connection re-establishment, wherein the first RRC message includes a first C-RNTI of the remote UE or a first identity of the remote UE. In step 2010, the second network node transmits a second RRC message corresponding to the first RRC message to the remote UE, wherein the second RRC message includes a second C-RNTI of the remote UE or a second identity of the remote UE.

In one embodiment, the second network node could perform a RRC connection establishment procedure with a relay UE, wherein the relay UE establishes a PC5 connection with the remote UE for a relay communication. Furthermore, the second network node could receive a third RRC message corresponding to the second RRC message from the remote UE. And, the PC5 connection may be a PC5 RRC connection or a PC5 unicast link.

In one embodiment, the second RRC message could be used for re-establishing a RRC connection with the second network node. The third RRC message could be used for completing the RRC connection reestablishment. The first C-RNTI of the remote UE or the first identity of the remote UE could be provided by a first network node.

In one embodiment, the first RRC message could be received from the remote UE directly or via the relay UE. The second RRC message could be transmitted to the remote UE directly or via the relay UE. The third RRC message could be received from the remote UE directly or via the relay UE.

In one embodiment, the first RRC message may include a first physical cell identity (PhysCellId). The first physical cell identity could be provided by the first network node.

In one embodiment, the second RRC message may also include a second physical cell identity (PhysCellId). The second physical cell identity could be included in a system information (e.g. Minimum SI) forwarded by the relay UE or a second relay UE from the second network node. The second physical cell identity (PhysCellId) could be used for the remote UE to include it in another RRC message for requesting RRC connection re-establishment.

In one embodiment, the first network node could be the same as the second network node. The second RRC message may not include the second C-RNTI of the remote UE or the second identity of the remote UE, or may include the first C-RNTI of the remote UE or the first identity of the remote UE if the second network node is the same as the first network node. The second RRC message may include the second C-RNTI of the remote UE or the second identity of the remote UE if the second network node is different from the first network node.

In one embodiment, the first or second network node could be a base station (e.g. gNB). The first RRC message may be a RRCReestablishmentRequest message. The second RRC message may be a RRCReestablishment message. The third RRC message may be a RRCReestablishmentComplete message.

Referring back to FIGS. 3 and 4, in one exemplary embodiment of a second network node to support UE-to-Network relay communication, the second network node 300 includes a program code 312 stored in the memory 310. The CPU 308 could execute program code 312 to enable the second network node (i) to receive a first RRC message from a remote UE for requesting RRC connection re-establishment, wherein the first RRC message includes a first C-RNTI of the remote UE or a first identity of the remote UE, and (ii) to transmit a second RRC message corresponding to the first RRC message to the remote UE, wherein the second RRC message includes a second C-RNTI of the remote UE or a second identity of the remote UE. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a remote User Equipment (UE) to support UE-to-Network relay communication, comprising:
   establishing a PC5 connection with a first relay UE for a relay communication with a first network node;
   performing a Radio Resource Control (RRC) connection establishment procedure with the first network node via the first relay UE for establishing an RRC connection between the remote UE and the first network node;
   receiving a security mode command from the first network node via the first relay UE, wherein the security mode command is used for activation of Access Stratum (AS) security on the RRC connection;
   receiving an RRC Reconfiguration message from the first network node via the first relay UE to modify the RRC connection, wherein the RRC Reconfiguration message includes a Cell Radio Network Temporary Identifier (C-RNTI) of the remote UE; and
   transmitting an RRC Reconfiguration Complete message to the first network node via the first relay UE in response to reception of the RRC Reconfiguration message from the first network node.

2. The method of claim 1, further comprising:
   transmitting a first RRC message for request of establishing the RRC connection between the first network node and the remote UE to the first network node via the first relay UE.

3. The method of claim 2, wherein the first RRC message is an RRC Setup Request message.

4. The method of claim 1, further comprising:
   receiving a second RRC message for establishing the RRC connection between the first network node and the remote UE from the first network node via the first relay UE.

5. The method of claim 4, wherein the second RRC message is an RRC Setup message.

6. The method of claim 1, further comprising:
   transmitting a third RRC message to a second network node via a second relay UE for requesting RRC connection reestablishment when the remote UE initiates an RRC connection reestablishment procedure, wherein the third RRC message includes the C-RNTI of the remote UE.

7. The method of claim 6, wherein the remote UE initiates the RRC connection reestablishment procedure, when the remote UE reselects a new relay UE, or when the first relay UE declares a radio link failure on a Uu link with the first network node.

8. The method of claim 6, wherein the third RRC message is an RRC Reestablishment Request message.

9. The method of claim 1, wherein the PC5 connection is a PC5 RRC connection or a PC5 unicast link.

10. The method of claim 1, wherein the RRC Reconfiguration message is a very first or an earliest RRC Reconfiguration message received from the first network node after the AS security is activated, and/or the RRC Reconfiguration message is used to establish at least one new data radio bearer (DRB).

11. A remote User Equipment (UE) to support UE-to-Network relay communication, comprising:
   a processor; and
   a memory operatively coupled to the processor, wherein the processor is configured to execute a program code to:
      establish a PC5 connection with a first relay UE for a relay communication with a first network node;
      perform a Radio Resource Control (RRC) connection establishment procedure with the first network node via the first relay UE for establishing an RRC connection between the remote UE and the first network node;
      receive a security mode command from the first network node via the first relay UE, wherein the security mode command is used for activation of Access Stratum (AS) security on the RRC connection;
      receive an RRC Reconfiguration message from the first network node via the first relay UE to modify the RRC connection, wherein the RRC Reconfiguration message includes a Cell Radio Network Temporary Identifier (C-RNTI) of the remote UE; and
      transmit an RRC Reconfiguration Complete message to the first network node via the first relay UE in response to reception of the RRC Reconfiguration message from the first network node.

12. The remote UE of claim 11, wherein the processor is further configured to execute a program code stored in the memory to:
   transmit a first RRC message for request of establishing the RRC connection between the first network node and the remote UE to the first network node via the first relay UE.

13. The method of claim 12, wherein the first RRC message is an RRC Setup Request message.

14. The remote UE of claim 11, wherein the processor is further configured to execute a program code stored in the memory to:
   receive a second RRC message for establishing the RRC connection between the first network node and the remote UE from the first network node via the first relay UE.

15. The method of 14, wherein the second RRC message is an RRC Setup message.

16. The remote UE of claim 11, wherein the processor is further configured to execute a program code to:
   transmit a third RRC message to a second network node via a second relay UE for requesting RRC connection re-establishment when the remote UE initiates an RRC connection reestablishment procedure, wherein the third RRC message includes the C-RNTI of the remote UE.

17. The remote UE of claim 16, wherein the remote UE initiates the RRC connection reestablishment procedure, when the remote UE reselects a new relay UE, or when the first relay UE declares a radio link failure on a Uu link with the first network node.

18. The remote UE of claim 16, wherein the third RRC message is an RRC Reestablishment Request message.

19. The remote UE of claim 11, wherein the PC5 connection is a PC5 RRC connection or a PC5 unicast link.

20. The method of claim 11, wherein the RRC reconfiguration message is a very first or an earliest RRC Reconfiguration message received from the first network node after the AS security is activated, and/or the RRC Reconfiguration message is used to establish at least one new data radio bearer (DRB).

21. A method for a network node to support User Equipment (UE)-to-Network relay communication, comprising:
   receiving a Radio Resource Control (RRC) Setup Request message from a remote UE via a relay UE for request of establishing an RRC connection between the network node and the remote UE;
   transmitting an RRC Setup message to the remote UE via the relay UE for establishing the RRC connection;
   transmitting a security mode command to the remote UE via the relay UE, wherein the security mode command is used for activation of Access Stratum (AS) security on the RRC connection;
   transmitting an RRC Reconfiguration message to the remote UE via the relay UE to modify the RRC connection, wherein the RRC Reconfiguration message includes a Cell Radio Network Temporary Identifier (C-RNTI) of the remote UE; and
   receiving an RRC Reconfiguration Complete message from the remote UE via the relay UE.

22. The method of claim 21, wherein the RRC Reconfiguration message is a very first or an earliest RRC Reconfiguration message transmitted by the network node after the AS security is activated, and/or the RRC Reconfiguration message is used to establish at least one new data radio bearer (DRB).

* * * * *